(12) United States Patent
Xiao

(10) Patent No.: US 6,921,166 B2
(45) Date of Patent: Jul. 26, 2005

(54) SPECTACLE SET WITH DETACHABLE SHELTER FRAME

(75) Inventor: Tony Xin Xiao, Walnut, CA (US)

(73) Assignee: Viva International Group, Somerville, NJ (US)

(*) Notice: Subject to any disclaimer, the term of this patent is extended or adjusted under 35 U.S.C. 154(b) by 0 days.

(21) Appl. No.: 10/371,110

(22) Filed: Feb. 24, 2003

(65) Prior Publication Data

US 2004/0165142 A1 Aug. 26, 2004

(51) Int. Cl.[7] .................................. G02C 9/00
(52) U.S. Cl. ........................ 351/47; 351/57
(58) Field of Search .................. 351/47, 57, 48, 351/58; D16/900

(56) References Cited

U.S. PATENT DOCUMENTS

| | | | | |
|---|---|---|---|---|
| 6,206,519 B1 * | 3/2001 | Lin | ............................ | 351/57 |
| 6,412,942 B1 * | 7/2002 | McKenna et al. | ............ | 351/47 |
| 6,478,420 B2 * | 11/2002 | Xiang | ......................... | 351/47 |
| 6,505,932 B2 * | 1/2003 | Xiao | ........................... | 351/57 |
| 6,755,522 B1 * | 6/2004 | Strenk | ........................ | 351/57 |
| 2002/0012097 A1 * | 1/2002 | Zelman | ..................... | 351/57 |

* cited by examiner

*Primary Examiner*—Huy Mai
(74) *Attorney, Agent, or Firm*—Raymond Y. Chan; David and Raymond

(57) ABSTRACT

A spectacle set includes a primary spectacle frame and a detachable shelter frame constructed for mounting behind the primary spectacle frame. The primary spectacle frame includes a frame body for mounting a pair of lenses in position, wherein the frame body includes a primary bridge connected between the two lenses, and two side extensions provided at two outer sides of the lenses respectively for coupling with a pair of temples respectively. The detachable shelter frame includes a shelter frame for supporting two auxiliary lenses and an attaching arrangement provided on a front side of the shelter frame to detachably mount the shelter frame behind the frame body, so as to securely mount the detachable shelter frame behind the primary spectacle.

24 Claims, 15 Drawing Sheets

US 6,921,166 B2

SPECTACLE SET WITH DETACHABLE SHELTER FRAME

BACKGROUND OF THE PRESENT INVENTION

1. Field of Invention

The present invention relates to a spectacle set, and more particularly to a spectacle set with a detachable shelter frame which is arranged to detachably mount behind a primary frame so as to prevent any accidentally dropping off of the shelter frame from the primary frame and to enhance the aesthetic appearance of the primary frame.

2. Description of Related Arts

Auxiliary shelter frame is commonly used nowadays. Especially, an auxiliary shelter frame with magnetic attachment is even more commonly used in recent market. A conventional spectacle set comprises a primary eyeglasses and an auxiliary frame detachably mounted in front of the primary eyeglasses in such a manner that the wearer is able to wear the primary eyeglasses as general and put the auxiliary frame on the primary eyeglasses as a sunglasses. However, the conventional spectacle set has several drawbacks.

Since the auxiliary frame is arranged to mount in front of the primary eyeglasses, the auxiliary frame may not be precisely aligned and engaged with the primary eyeglasses in a correct position. Therefore, the auxiliary frame may fall off from the primary eyeglasses easily especially during sporting or doing exercise. In other words, the configuration of the spectacle set fails to securely mount the auxiliary frame on the primary eyeglasses.

Moreover, when the auxiliary frame is mounted in front of the primary eyeglasses, the center of mass of the spectacle set will be substantially moved forward from the primary eyeglasses. Therefore, when the wearer wears the spectacle set, the primary eyeglasses and the auxiliary frame may cause uncomfortability to the wearer because the center of mass of the spectacle set may locate in front of the wearer's face.

Due to the construction of the primary bridge of the primary eyeglasses, if the gap formed between the auxiliary frame and the primary eyeglasses is too big, a double vision may be created when the light is refracted from the lenses of the auxiliary frame to the lenses of the primary eyeglasses through the gap. Therefore, most of the manufacturers try to minimize the distance between the primary eyeglasses and the auxiliary frame so as to reduce the phenomenon of double vision.

In addition, the primary eyeglasses must be employed with an attachment device to hold the auxiliary frame in front of the primary eyeglasses. The attachment device generally comprises a pair of magnetic members affixed at the front surfaces of two sides of the primary eyeglasses and a pair of corresponding magnets provided at the rear surfaces of two sides of the auxiliary frame for magnetically attaching with the magnetic members respectively so as to mount the auxiliary frame in front of the primary eyeglasses.

When the auxiliary frame is detached from the primary eyeglasses, the magnet members on the primary eyeglasses adversely affect the ornamental appearance of the primary eyeglasses. If a pair of smaller magnet members is used to keep the ornamental appearance of the primary eyeglasses, not only the wearer will suffer in the difficulty of aligning the auxiliary frame with the primary eyeglasses, but also the auxiliary frame will easily drop off due to even a slightly head shake. Furthermore, since the size of the primary eyeglasses is getting smaller and smaller, smaller size of magnet members must be used for incorporating with the primary eyeglasses, which may further weaken the magnetic attachment between the primary eyeglasses and the auxiliary frame.

Generally, the size of the auxiliary frame must be larger than the size of the primary eyeglasses such that when the auxiliary frame is mounted in front of the primary eyeglasses, the auxiliary frame can entirely cover the primary eyeglasses. However, the ornamental appearance of the primary eyeglasses will be blocked by the auxiliary frame.

In order to further secure the attachment of the auxiliary frame with the primary eyeglasses, a bridge clip is generally provided on the auxiliary frame to ride on the primary bridge of the primary eyeglasses. However, the bridge clip not only substantially increases the overall weight of the auxiliary frame but also complicates the mounting procedures of the auxiliary frame on the primary eyeglasses.

SUMMARY OF THE PRESENT INVENTION

A main object of the present invention is to provide a spectacle set which comprises a primary spectacle frame and a detachable shelter frame arranged to mount behind the primary spectacle frame so as to prevent the detachable shelter frame from dropping off from the primary frame and to enhance the aesthetic appearance of the primary spectacle frame.

Another object of the present invention is to provide a spectacle set, wherein the detachable shelter frame can be precisely and easily attached behind the primary spectacle frame by means of an attaching arrangement provided on the detachable shelter frame.

Another object of the present invention is to provide a spectacle set, wherein the detachable shelter frame is held behind the primary spectacle frame and supported by the wearer's nose, so as to prevent the detachable shelter frame from dropping down with respect to the primary spectacle frame. In addition, the ornamental appearance of the primary spectacle frame won't be blocked by the detachable shelter frame.

Another object of the present invention is to provide a spectacle set, wherein the attaching arrangement can be constructed as any kinds of existing attaching device such as magnetic engagement, clipping engagement or resilient engagement.

Another object of the present invention is to provide a spectacle set, wherein since the detachable shelter frame is mounted behind the primary spectacle frame, the distance between detachable shelter frame and the primary spectacle frame is minimized to better prevent the phenomenon of the double vision.

Another object of the present invention is to provide a spectacle set, wherein the rear-attaching configuration of the spectacle set c an prevent up and down or sideward movement of the detachable shelter frame with respect to the primary spectacle frame.

Another object of the present invention is to provide a spectacle set, which provides a simple but secure attachment between the primary spectacle frame and the detachable shelter frame so as to minimize the manufacturing cost of the detachable shelter frame.

Another object of the present invention is to provide a spectacle set, wherein the wearer may merely use one hand to attach or detach the detachable shelter frame during exercising or driving.

Accordingly, in order to accomplish the above objects, the present invention provides a spectacle set comprising a primary spectacle frame and a detachable shelter frame. The primary spectacle frame comprises a frame body which comprises a primary bridge connected between two lenses, and two side extensions provided at two outer sides of the lenses respectively for coupling with two temples respectively.

The detachable shelter frame comprises a shelter frame supporting two auxiliary lenses and an attaching arrangement provided on the shelter frame to detachably mount the shelter frame of the detachably shelter frame behind the frame body of the primary spectacle frame securely.

These and other objectives, features, and advantages of the present invention will become apparent from the following detailed description, the accompanying drawings, and the appended claims.

DETAILED DESCRIPTION OF THE PREFERRED EMBODIMENTS

Figure 1:
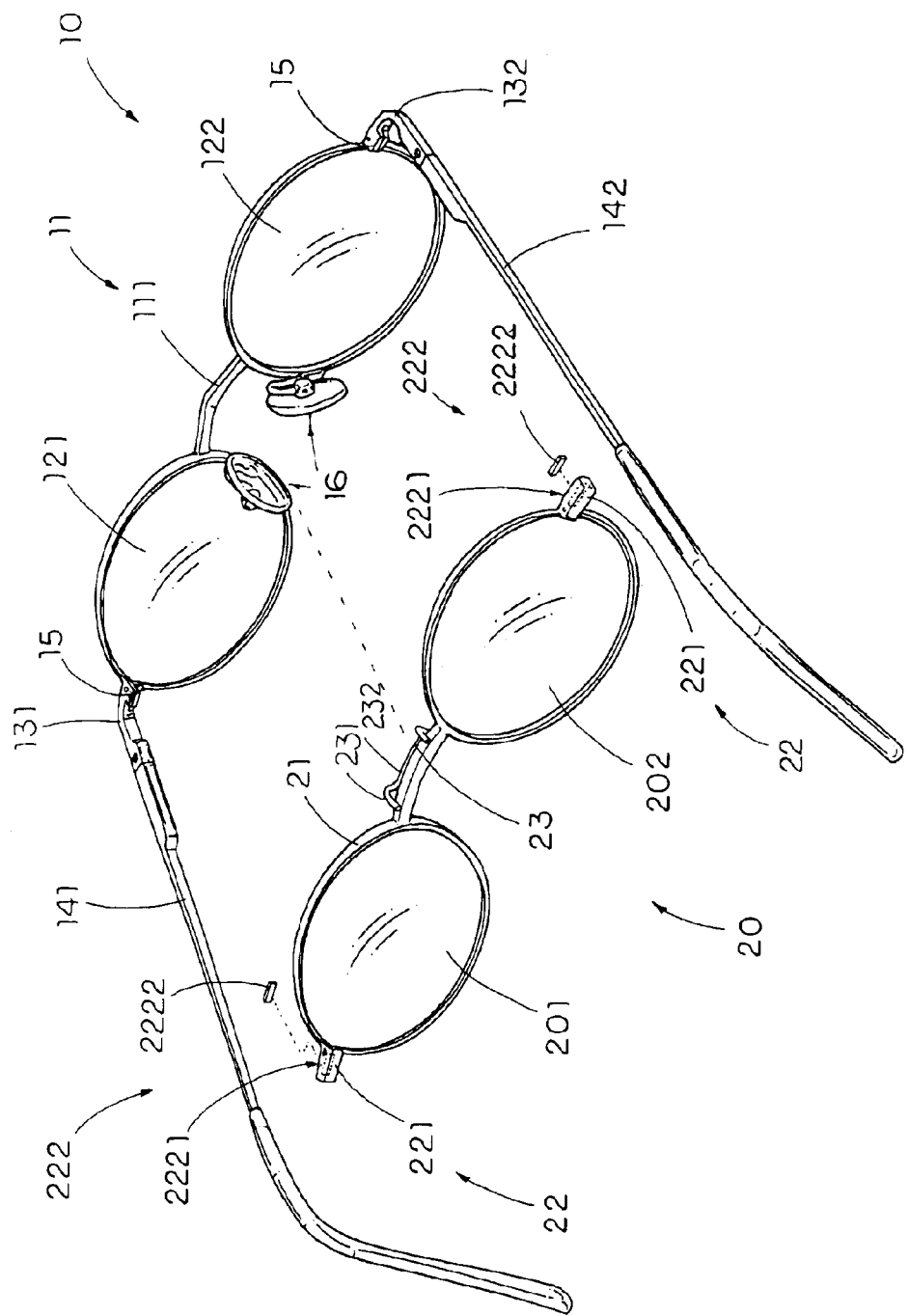
FIG. 1 is a perspective view of a spectacle set according to a first preferred embodiment of the present invention.

Referring to FIG. 1 of the drawings, a spectacle set according to a first preferred embodiment of the present invention is illustrated, wherein the spectacle set comprises a primary spectacle frame 10 and a detachable shelter frame 20.

The primary spectacle frame 10, such as a conventional spectacle frame, comprises a frame body 11 for mounting a pair of lenses 121, 122 in position. The frame body 11 comprises a primary bridge 111 connected between the two lenses 121, 122, and two side extensions 131, 132 provided at two outer sides of the lenses 121, 122 respectively for coupling with two temples 141, 142 respectively.

Figure 5A:
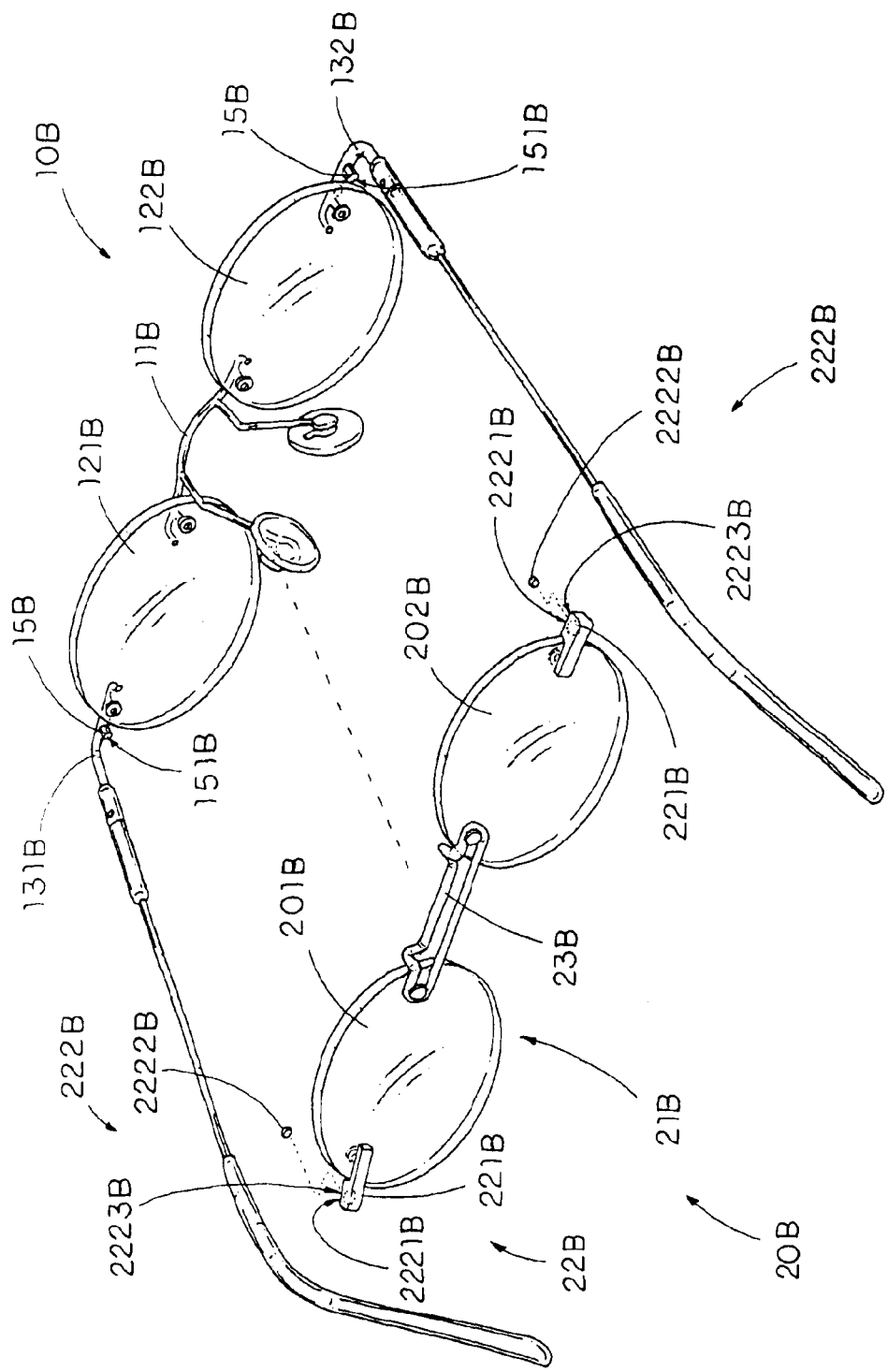
FIG. 5A illustrates a second alternative mode of the spectacle set according to the above first preferred embodiment of the present invention.

The frame body 11 of the primary spectacle frame 10 can be constructed as the conventional spectacle frame to have a pair of lens rims, as shown in FIG. 1 or the rimless frame, as shown in FIG. 5A, that the primary bridge 111 and the two side extensions 131, 132 are directly fastened to the edges of the two lenses 121, 122. In other words, the primary spectacle frame 10 does not require modifying its original structure for mounting the detachable shelter frame 20 thereon.

The detachable shelter frame 20 comprises a shelter frame 21 for supporting two auxiliary lenses 201, 202 and an attaching arrangement 22 provided on a front side surface of the shelter frame 20 to detachably attach the shelter frame 20 to the frame body 11, so as to securely mount the detachable shelter frame 20 behind the primary spectacle frame 10.

As shown in FIG. 1, the primary spectacle frame 10 further comprises two magnetic holders 15, each of which has a magnetic attraction ability, provided at rear surfaces of two outer sides of the lenses 121, 122 of the frame body 11 respectively, wherein each of the magnetic holders 15 is made of a kind of metal having magnetic attraction ability such as mild steel, low carbon steel and high grade steel, which is attractive to magnetic material such as permanent magnet. According to the first preferred embodiment, the two magnetic holders 15 are respectively provided at two rim lockers of the frame body 11, which are connected to two outer sides of the lenses 121, 122 of the primary spectacle frame 10, as shown in FIG. 1. Alternatively, two magnets can be mounted to the rear surfaces of the two side extensions 131, 132 to function as the two magnetic holders 15 respectively.

Figure 2:
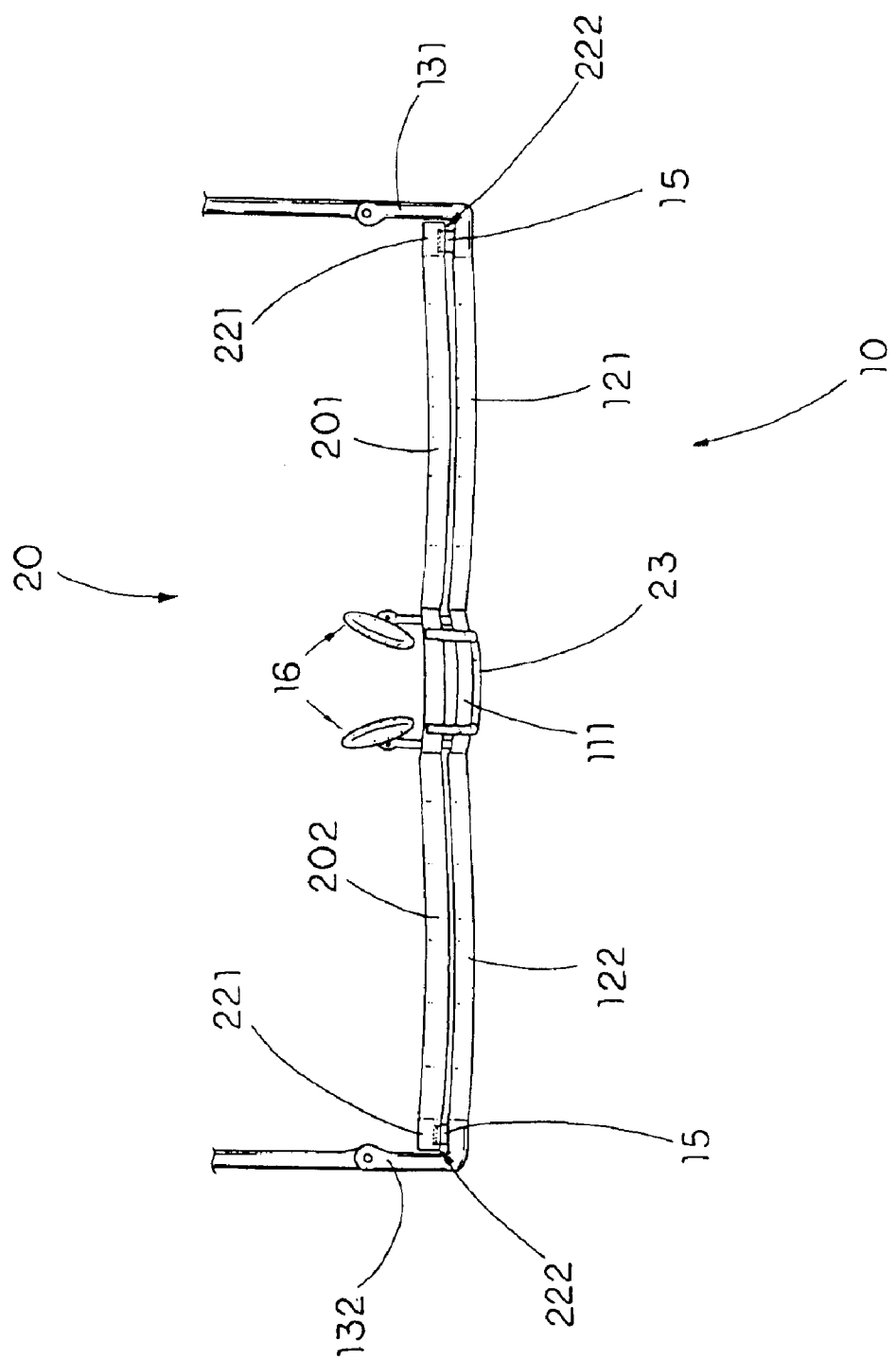
FIG. 2 is a top view of the spectacle set according to the above first preferred embodiment of the present invention, illustrating the detachable shelter frame mounted behind the primary spectacle frame.

The attaching arrangement 22 comprises two supporting arms 221 extended from two outer sides of the auxiliary lenses 201, 202 respectively with respect to the magnetic holders 15 of the primary spectacle frame 10 and two magnetic seats 222 which are connected to the supporting arms 221 respectively and arranged to magnetically attach to the magnetic holders 15 respectively so as to hold the shelter frame 21 of the detachable shelter frame 20 behind the frame body 21 of the primary spectacle frame 10 in position, as shown in FIG. 2.

Each of the magnetic seats 222 comprises a magnetic housing 2221 frontwardly extended from the respective supporting arm 221, wherein each magnetic seat 222 is made of non-magnetic material or soft-magnetic metal having magnetic attraction ability such as mild steel, low carbon steel and high grade steel and a magnet 2222 mounted in the magnetic housing 2221, which is arranged to face toward and align with the respective magnetic holder 15 of the frame body 11 when the detachable shelter frame 20 is mounted behind the primary spectacle frame 10.

Figure 3:
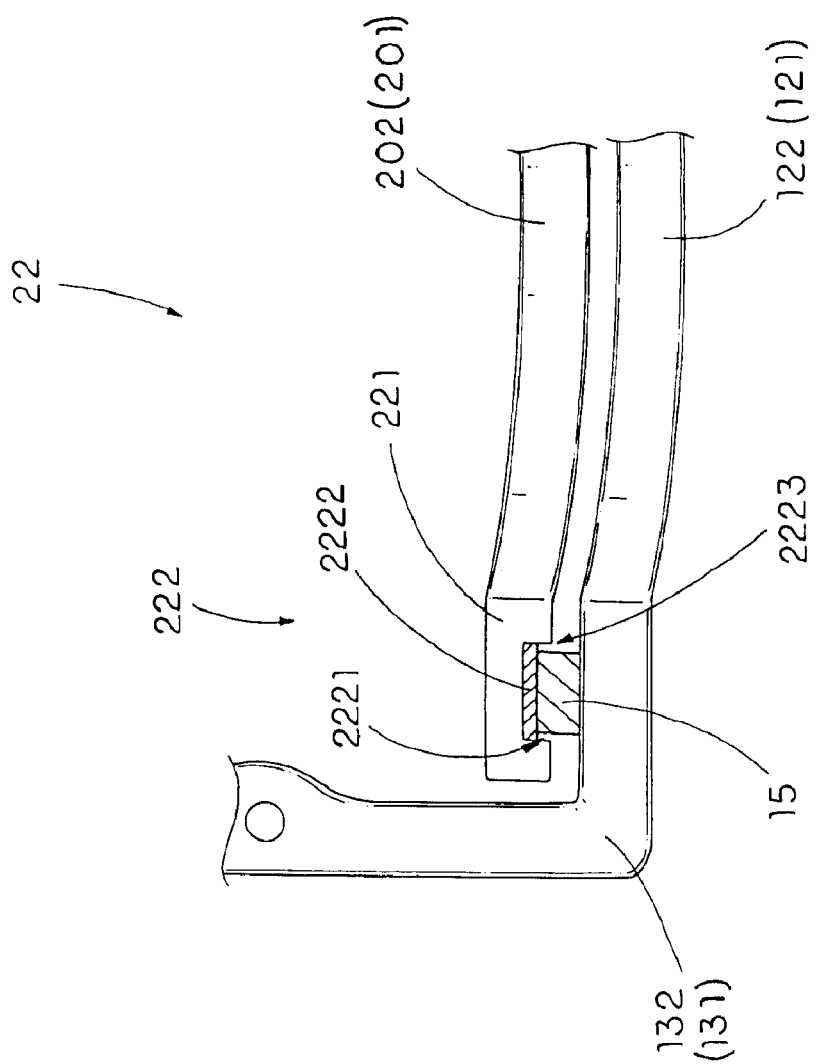
FIG. 3 is a sectional view of the attaching arrangement of the spectacle set according to the above first preferred embodiment of the present invention.

As shown in FIG. 3, the two magnetic holders 15 function as two engaging members protruded from the frame body 11. Each of the magnets 2222 has a thickness smaller than a depth of the respective magnetic housing 2221 so as to define an engaging groove 2223 when the magnet 2222 is embedded in the magnetic housing 2221 for fittedly engaging with the respective magnetic holder 15. In other words, the magnetic holders 15 are received in the two engaging grooves 2223 respectively, so as to further guide the attaching arrangement 22 of the detachable shelter frame 20 to magnetically attach to the magnetic holders 15 of the primary spectacle frame 10.

Alternatively, the engaging grooves 2223 can be formed on the magnetic holders 15 respectively, wherein each of the magnets 2222 has a thickness larger than a depth of the respective magnetic housing 2221 so as to form an engaging member for fittedly engaging with the respective engaging groove 2223 of the magnetic holder 15.

According to the preferred embodiment, the detachable shelter frame 20 may further comprises a clip bridge 23 extended between the two auxiliary lenses 201, 202 for securely engaging with the primary bridge 111 of the primary spectacle frame 10 so as to further secure the attachment of the detachable shelter frame 20 behind the primary spectacle frame 10.

The clip bridge 23 of the detachable shelter frame 20 is in U-shaped and comprises two rearwardly extending side wires 231 adapted for supporting on two ends of the primary bridge 111 of the frame body 11 and a downwardly curved clipping wire 232 extending in front of the primary bridge 111, so that the clip bridge 23 is securely clipped on the primary bridge 111 when the detachable shelter frame 20 is mounted behind the primary spectacle frame 10, as shown in FIGS. 1 and 2.

It is worth to mention that the attaching arrangement 20 can be embodied as the clip bridge 23 to mount the detachable shelter frame 20 behind the primary spectacle frame 10. It is because the detachable shelter frame 20 is held by the primary spectacle frame 10 though the clip bridge 23 and supported by the wearer's nose, that prevents the detachable shelter frame 20 from dropping off the primary spectacle frame 10. Even though there is no magnetic attachment involved in the spectacle set, merely by incorporating the clip bridge 23 with the detachable shelter frame 20 can substantially mount the detachable shelter frame 20 behind the primary spectacle frame 10, so that the manufacturing cost of the spectacle set of the present invention can be minimized according to the present invention.

In order to mount the shelter frame 21 behind the primary spectacle frame 10, the wearer may simply use one hand to put the shelter frame 21 behind the frame body 11 and drop it down. Due to the magnetic attraction, the two magnetic seats 222 of the shelter frame 21 are magnetically attracted to the magnetic holders 15 of the frame body 11 respectively, so as to guide the shelter frame 21 to automatically align with the primary spectacle frame 10. So, the present invention provides not only the magnetic attraction but also the interlocking engaging for securely mounting the shelter frame 21 of the detachable shelter frame 20 behind the frame body 11 of the primary spectacle frame 10. It there is the clip bridge 23, it will securely clip on the primary bridge 111 of the primary spectacle frame 10, so as to securely interlock the shelter frame 21 with the frame body 11.

The wearer can also detach the shelter frame 21 from the frame body 11 of the primary spectacle frame 10 easily by slightly pulling the shelter frame away from the primary spectacle frame 10 until the two magnetic seats 222 move apart from the two magnetic holders 15 respectively, so as to release the magnetic engagement between the shelter frame 21 and the frame body 11. Then, at the same time, the wearer may detach the shelter frame 21 by simply lifting it up from the primary spectacle frame 10 with one hand. In other words, the wearer may simply use one hand to operate the detachable shelter frame 20 to attach to or detach from the primary spectacle frame 10. Especially, when the wearer is exercising or driving, it is dangerous for him or her to use both hands to wear the detachable shelter frame 20.

Since the detachable shelter frame 20 is held behind the primary spectacle frame and supported by either the wearer's nose or the nose supports 16 of the primary spectacle frame 10, the detachable shelter frame 20 will not accidentally drop off from the primary spectacle frame 10. Practically, no strong magnetic attraction is required to use to mount the detachable shelter frame 20 behind the primary spectacle frame 10, so that the size of the magnet 2222 can be minimized to reduce the overall weight of the detachable shelter frame 20.

Thus, since the detachable shelter frame 20 is mounted behind the primary spectacle frame 10, the auxiliary lenses 201, 202 of the detachable shelter frame 20 can be positioned as close to the lenses 121, 122 of the primary spectacle frame 10 as possible, so as to minimize a distance therebetween. When the detachable shelter frame is mounted behind the primary spectacle frame 10, the center of mass of the spectacle set is moved rearwardly that is closer to the wearer's face so as to enhance the comfortability of the spectacle set. In addition, the ornamental appearance of the primary spectacle frame 10 won't be blocked by the detachable shelter frame 20.

In addition, it is obvious that the magnets 2222 can be provided at the magnetic holders 15 respectively while the magnetic seats 222 are made of non-magnetic material or soft-magnetic metal having magnetic attraction ability so as to enhance the magnetic engagement between the detachable shelter frame 20 and the primary spectacle frame 10.

Figure 4:
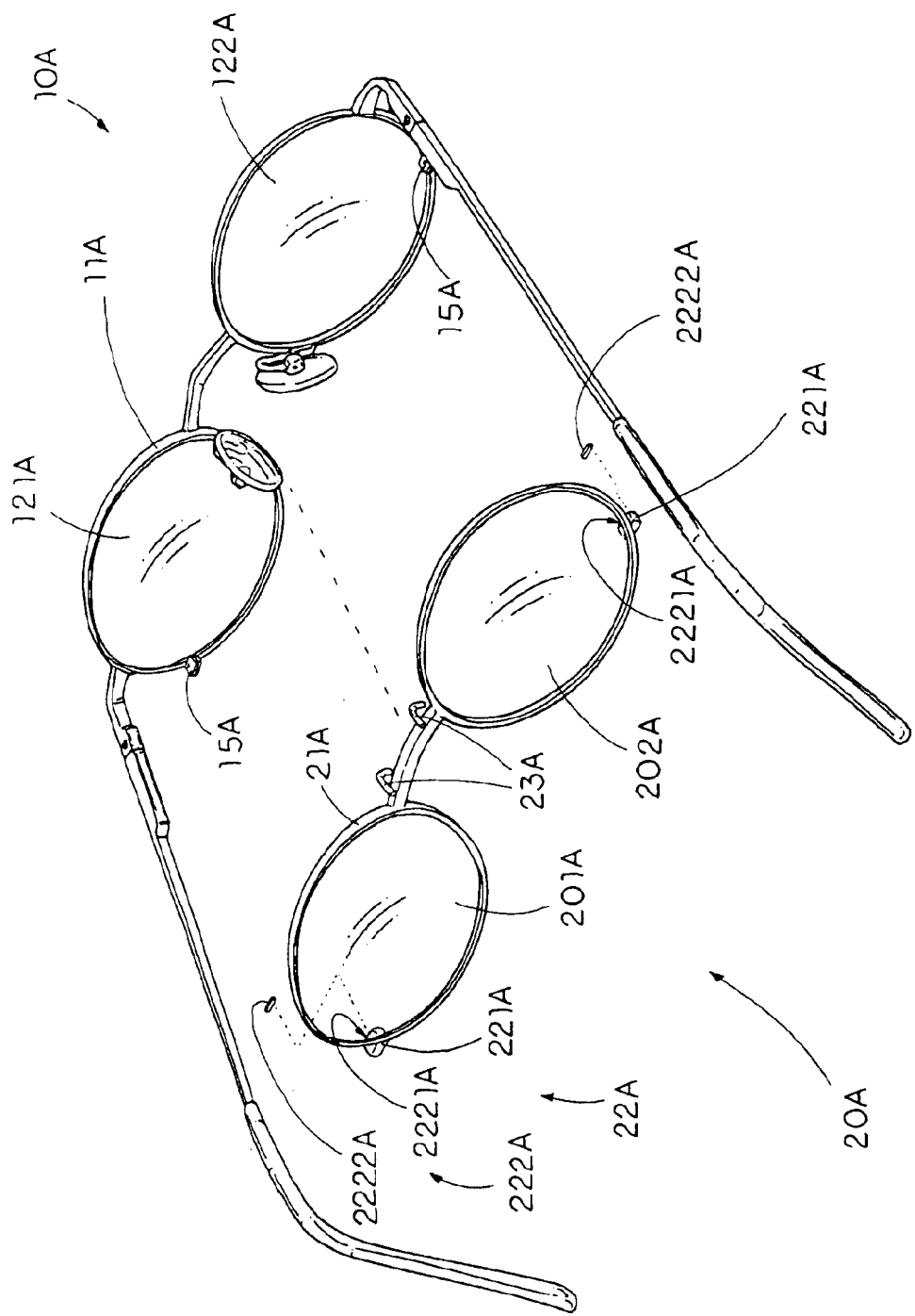
FIG. 4 illustrates a first alternative mode of the spectacle set according to the above first preferred embodiment of the present invention.

FIG. 4 illustrates a first alternative mode of the detachable shelter frame 20A wherein the magnetic attachment between the primary spectacle frame 10A and the detachable shelter frame 20A can be located at different positions thereof. The two magnetic holders 15A are provided at the rear surfaces of two lower sides of the lenses 121A, 122A respectively, wherein each of the magnetic holders 15A is made of a kind of metal having magnetic attraction ability that is attractive to magnetic material, or that two magnets can be mounted on the rear surfaces of the two lower sides of the lenses 121A, 122A to function as the two magnetic holders 15 respectively.

The two supporting arms 221A are frontwardly extended from two lower sides of the auxiliary lenses 201A, 202A respectively towards the magnetic holders 15A of the primary spectacle frame 10A, wherein the two magnetic seats 222A are connected to the supporting arms 221A respectively and arranged to magnetically attach to the magnetic holders 15A respectively, so as to hold the shelter frame 21A of the detachable shelter frame 20A behind the frame body 21A of the primary spectacle frame 10A in position. It is worth to mention that each of the magnetic seats 222A is constructed as same as the magnetic seat 222 of the first preferred embodiment in order to magnetically attract the magnetic seats 222A with the magnetic holders 15A respectively.

It is apparent that the two supporting arms 221A can also be frontwardly extended from two upper sides of the auxiliary lenses 201A, 202A respectively towards the magnetic holders 15A while the two magnetic holders 15A are provided at two upper sides of the lenses 121A, 122A of the frame body 11A of the primary spectacle frame 10A.

FIG. 5A illustrates a second alternative mode of the detachable shelter frame 20B according to the first preferred embodiment of the present invention, wherein the two magnetic holders 15B is provided at the two side extensions 131B, 132B of the frame body 11B respectively. Accordingly, each of the side extensions 131B, 132B is embodied as the respective magnetic holder 15B and is made of a kind of metal having magnetic attraction ability that is attractive to magnetic material or permanent magnet.

The two supporting arms 221B are frontwardly extended from two outer sides of the auxiliary lenses 201B, 202B respectively towards the side extensions 131B, 132B of the primary spectacle frame 10B wherein the two magnetic seats 222B which are connected to the supporting arms 221B respectively and arranged to magnetically attach to the magnetic holders 15B of the side extensions 131B, 132B respectively so as to hold the shelter frame 21B of the detachable shelter frame 20B behind the frame body 21B of the primary spectacle frame 10B in position.

Accordingly, each of the magnetic holders 15B comprises an engaging member 151B protruded from the respective side extension 131B, 132B. Each of the magnets 2222B has a thickness smaller than a depth of the respective magnetic housing 2221B so as to define an engaging groove 2223B when the magnet 2222B is embedded in the magnetic housing 2221B for fittedly engaging with the respective engaging member 151B of the magnetic holder 15B, so as to further guide the attaching arrangement 22B of the detachable shelter frame 20B to magnetically attach to the magnetic holders 15B of the primary spectacle frame 10B.

Also, the clip bridge 23A, 23B can be incorporated with the detachable shelter frame 20A, 20B according to the first and second alternative modes of the first embodiment to further secure the attachment of the detachable shelter frame 20A, 20B behind the primary spectacle frame 10A, 10B.

In addition, the two magnetic holders 15B can be provided on top of the two side extensions 1311B, 132B of the frame body 11B respectively, wherein two supporting arms 221B are frontwardly extended from two outer sides of the auxiliary lenses 201B, 202B respectively to ride over the two side extensions 131B, 132B of the primary spectacle frame 10B, wherein the two magnetic seats 222B which are connected to the supporting arms 221B respectively and arranged to magnetically attach to the side extensions 1311B, 132B respectively so as to hold the shelter frame 211B of the detachable shelter frame 20B behind the frame body 21B of the primary spectacle frame 10B in position.

It is worth to mention that the supporting arms 221B are affixed to rear sides of the auxiliary lenses 201B, 202B and extended frontwardly towards the magnetic holders 15B respectively, such that when the magnetic seats 222B are magnetically attach to the magnetic holders 15B so as to mount the detachable shelter frame 20B behind the primary spectacle frame 10B, a distance between the lenses 121B, 122B of the frame body 211B and the auxiliary lenses 2011B, 202B can be substantially reduced. In other words, the gap between the primary spectacle frame 110B and the detachable shelter frame 20B can be minimized according to the structural configuration of the detachable shelter frame 20B.

Figure 5B:
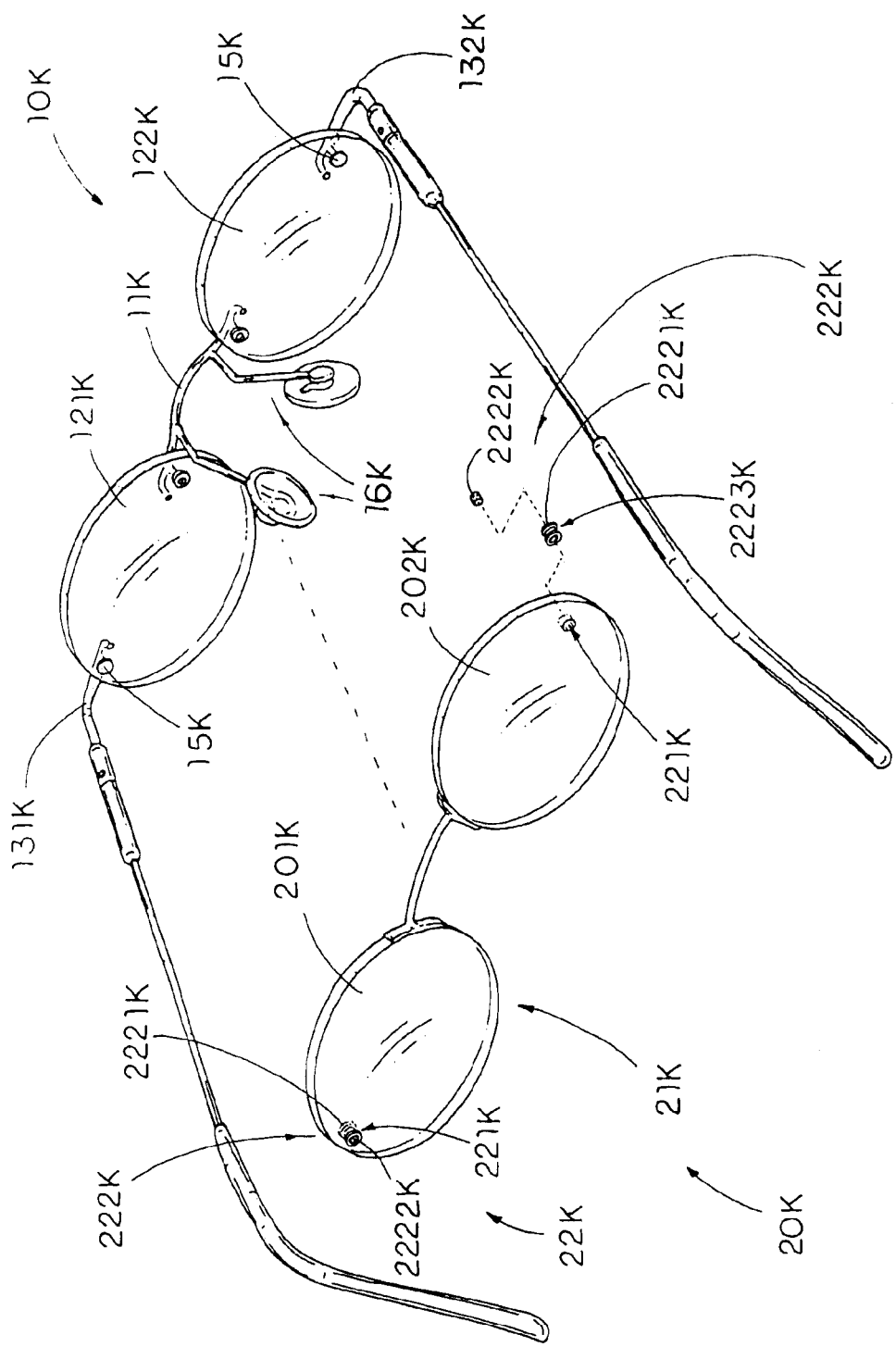
FIG. 5B illustrates a third alternative mode of the spectacle set according to the above first preferred embodiment of the present invention.

FIG. 5B illustrates a third alternative mode of the detachable shelter frame 20K, wherein the primary spectacle frame 10K is embodied as a rimless spectacle frame, wherein the two side extensions 131K, 132K are directly fastened to two outer sides of the lenses 121K, 122K respectively. The two magnetic holders 15B are respectively constructed as the rim lockers which are made of permanent magnet or a kind of metal having magnetic attraction ability that is attractive to magnetic material.

The attaching arrangement 22K has two receiving cavities 221K which are two through holes provided at two outer sides of the auxiliary lenses 201K, 202K and comprises two magnetic seat 222K which are securely mounted at the receiving cavities 221K of the auxiliary lenses 201K, 202K respectively and arranged to magnetically attach to the magnetic holders 15K respectively, so as to mount the shelter frame 21K of the detachable shelter frame 20K behind the frame body 21K of the primary spectacle frame 10K.

As shown in FIG. 5B, each of the magnetic seats 222K comprises a tubular magnetic housing 2221K inserted in the receiving cavities 221K of the respective auxiliary lens 201K, 202K and a magnet 2222K mounted in the magnetic housing 2221K, wherein the magnets 2222K are arranged to face toward and align with the magnetic holders 15K of the frame body 11K when the detachable shelter frame 21K is mounted behind the primary spectacle frame 10K.

Figure 5C:
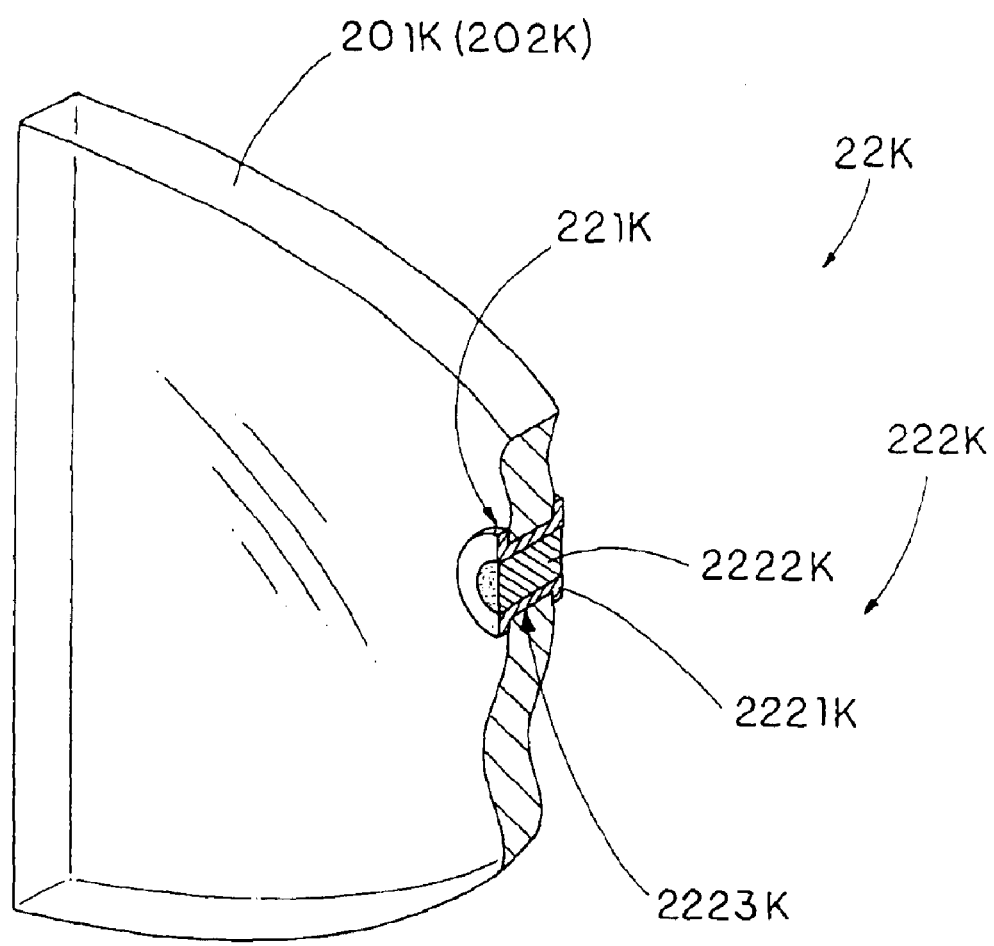
FIG. 5C is a sectional perspective view of the magnetic seat of the spectacle set according to the third alternative mode of the above first preferred embodiment of the present invention.

Accordingly, each of the magnetic housing 2221K has a receiving groove 2223K coaxially formed around an outer circumferential surface wherein a width of the receiving groove 2223K should be at least equal to a width of the respective auxiliary lens 201K, 202K such that when the magnetic housing 2221K is mounted in the receiving cavities 221K of the respective auxiliary lens 201K, 202K, an outer circumferential edge of the receiving cavity 221K is substantially received in the receiving groove 2223K, as shown in FIG. 5C. In other words, two outer portions of the magnetic housing 2221K are extended to the front and rear side surfaces of the auxiliary lens 201K, 202K respectively so as to retain the magnet 2222K on the auxiliary lens 201K, 202K in position.

In accordance with the third alternative mode, no supporting arm is required extending from the auxiliary lenses 201K, 202K towards the magnetic holders 15K, wherein the auxiliary lenses 201K, 202K are directly mounted behind the lenses 121K, 122K by magnetically attaching the magnetic seats 222K to the magnetic holders 15K respectively. It minimizes the distance between the auxiliary lenses 201K, 202K and the lenses 121K, 122K. In addition, the detachable shelter frame 20K can be securely mounted behind the primary spectacle frame 10K even though there is no clip bridge is incorporated with the detachable shelter frame 20K since the detachable shelter frame 20K is close enough to the primary spectacle frame 10K and substantially supported by either the wearer's nose or the nose supports 16K.

It is apparent that the two magnetic holders 15K can be provided at two inner sides of the lenses 121K, 122K as two rim lockers of the primary bridge 111B between the lenses 121K, 122K wherein the two magnetic seats 222K are provided at two inner sides of the auxiliary lenses 201K, 202K to magnetically attach to the magnetic holders 15K respectively.

Figure 6A:
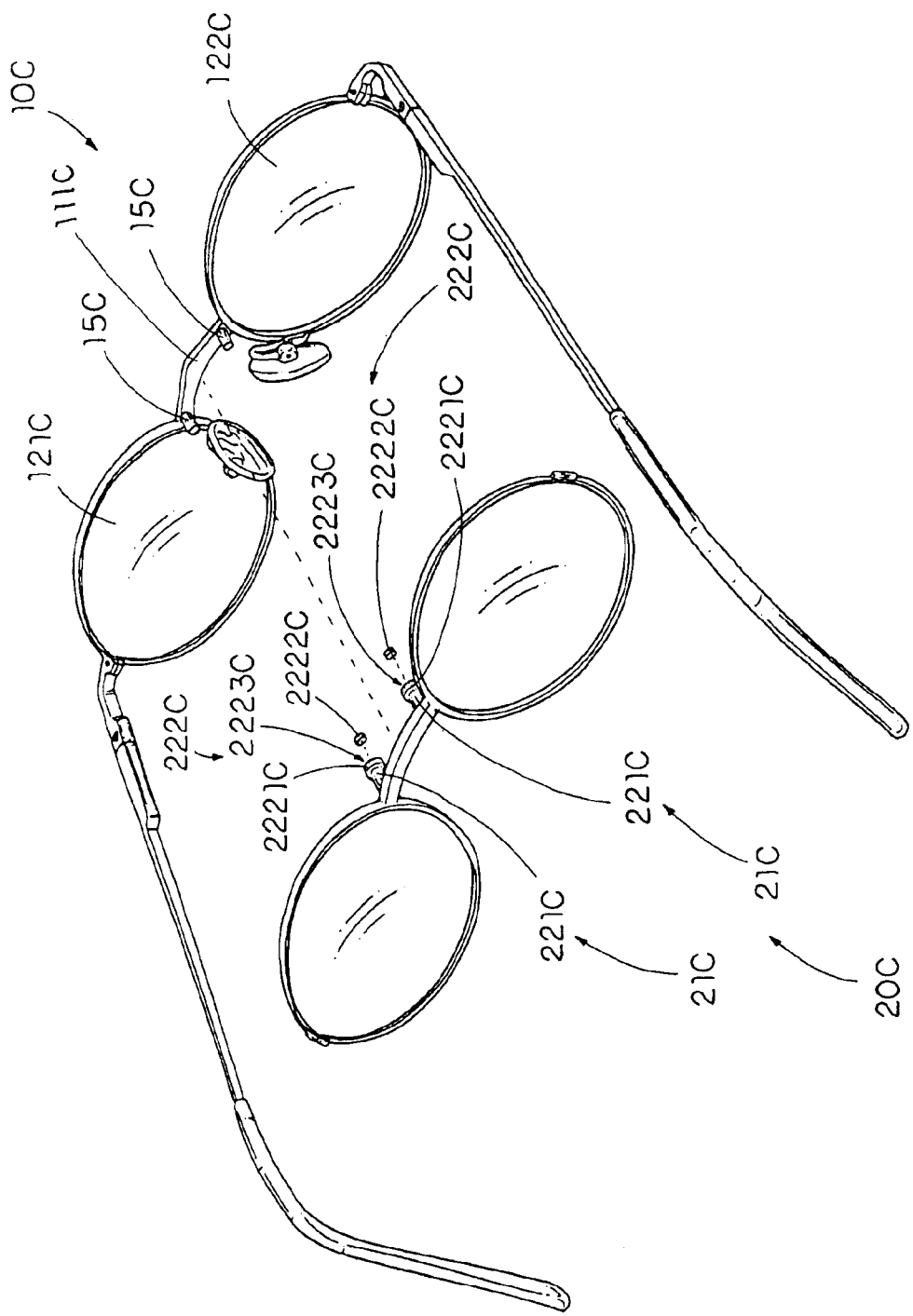
FIG. 6A illustrates a fourth alternative mode of the spectacle set according to the above first preferred embodiment of the present invention.

FIG. 6A illustrates a fourth alternative mode of the detachable shelter frame 20C of the first preferred embodiment, wherein the two magnetic holders 15C are mounted at two inner sides of the lenses 121C, 122C of the primary spectacle frame 10C.

The two supporting arms 221C are frontwardly extended from two inner sides of the auxiliary lenses 201C, 202C respectively towards magnetic holders 15C of the primary spectacle frame 10C wherein the two magnetic seats 222C which are connected to the supporting arms 221C respectively and arranged to magnetically attach to the magnetic holders 15C respectively so as to hold the shelter frame 21C of the detachable shelter frame 20C behind the frame body 21C of the primary spectacle frame 10C in position.

Accordingly, each of the magnetic holders 15C comprises an engaging member 151C protruded from the rear surface of the primary bridge 111C. Each of the magnets 2222C has a thickness smaller than a depth of the respective magnetic housing 2221C so as to define an engaging groove 2223C when the magnet 2222C is embedded in the magnetic housing 2221C for fittedly engaging with the respective engaging member 151C of the magnetic holder 15C, so as to further guide the attaching arrangement 22C of the detachable shelter frame 20C to magnetically attach to the magnetic holders 15C of the primary spectacle frame 10C.

Figure 6B:
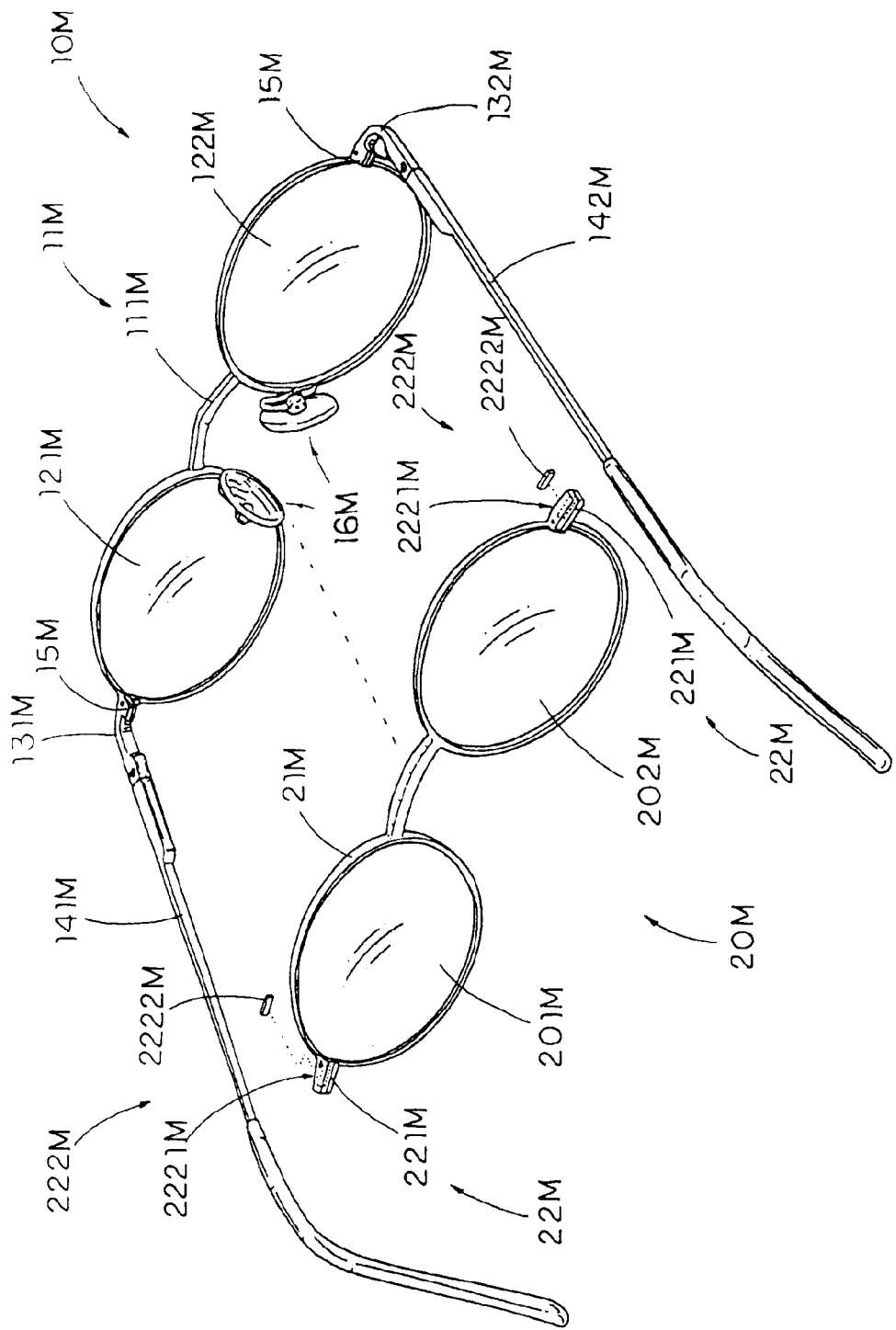
FIG. 6B illustrates a fifth alternative mode of the spectacle set according to the above first preferred embodiment of the present invention.

FIG. 6B illustrates a fifth alternative mode of the detachable shelter frame 20M, wherein the magnetic holders 15M are embodied as two rim lockers of the frame body 11M and provided at rear surfaces of two outer sides of the lenses 121M, 122M of primary spectacle frame 10M.

The two supporting arms 221M are embodied as two rim lockers of the detachable shelter frame 20M and extended from two outer sides of the auxiliary lenses 201M, 202M respectively towards the magnetic holders 15M of the primary spectacle frame 10M.

The two magnetic seats 222M are provided front sides of the supporting arms 221M respectively and arranged to magnetically attach to the magnetic holders 15M respectively so as to mount the shelter frame 21M of the detachable shelter frame 20M behind the frame body 21M of the primary spectacle frame 10M in position.

Each of the magnetic seats 222M comprises a magnetic housing 2221M frontwardly extended from the respective supporting arm 221M and a magnet 2222M which is mounted in the magnetic housing 2221M and arranged to face toward and align with the respective magnetic holder 15M of the frame body 11M when the detachable shelter frame 20M is mounted behind the primary spectacle frame 10M.

According to the attaching configuration of the spectacle set, the detachable shelter frame 20M is substantially mounted behind and close to the primary spectacle frame 10M by magnetically attaching the magnetic seats 222M to the magnetic holders 15M respectively. It minimizes the distance between the auxiliary lenses 201M, 202M. Moreover, while either the wearer's nose or the nose supports 16M, can well support the primary spectacle frame 10M as well as the detachable shelter frame 20 therebehind, no clip bridge is required to incorporate with the detachable shelter frame 20M in order to secure the attachment between the detachable shelter frame 20M and the primary spectacle frame 10M to prevent the detachable shelter frame 20M accidentally dropping off from the primary spectacle frame 10M.

Figure 7:
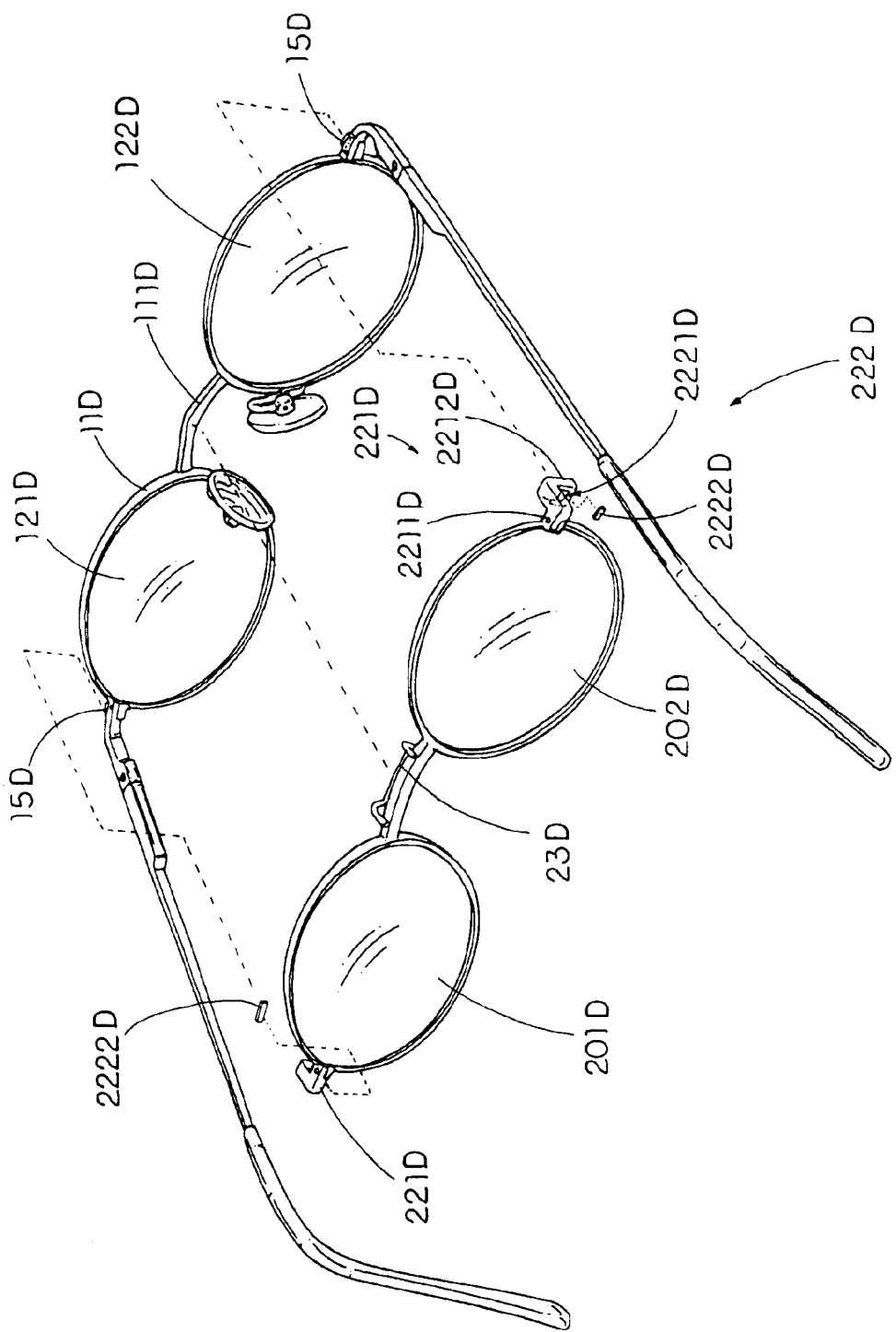
FIG. 7 is a perspective view of a spectacle set according to a second preferred embodiment of the present invention.

As shown in FIG. 7, a spectacle set of a second embodiment illustrates an alternative mode of the first embodiment of the present invention, wherein the primary spectacle frame 10D comprises two magnetic holders 15D, each of which has a magnetic attraction ability, provided at front surfaces of two outer sides of the frame body 11D, wherein each of the magnetic holders 15D is made of a kind of metal having magnetic attraction ability such as mild steel, low carbon and high grade steel, which is attractive to magnetic material such as permanent magnet.

The attaching arrangement 22D comprises two supporting arms 221D frontwardly extending from two outer sides of the auxiliary lenses 201D, 202D of the shelter frame 21D for riding on or over two outer sides of the lenses 121D, 122D of the frame body 11D respectively so as to securely mount the shelter frame 21D behind the frame body 11D. the attaching arrangement 22D further comprises two magnetic seats 222D which are connected to the supporting arms 221D respectively and arranged to magnetically attach to the magnetic holders 15D of the primary spectacle frame 10D respectively, so as to hold the shelter frame 21D of the detachable shelter frame 20D behind the frame body 11D of the primary spectacle frame 10D in position.

Figure 8:
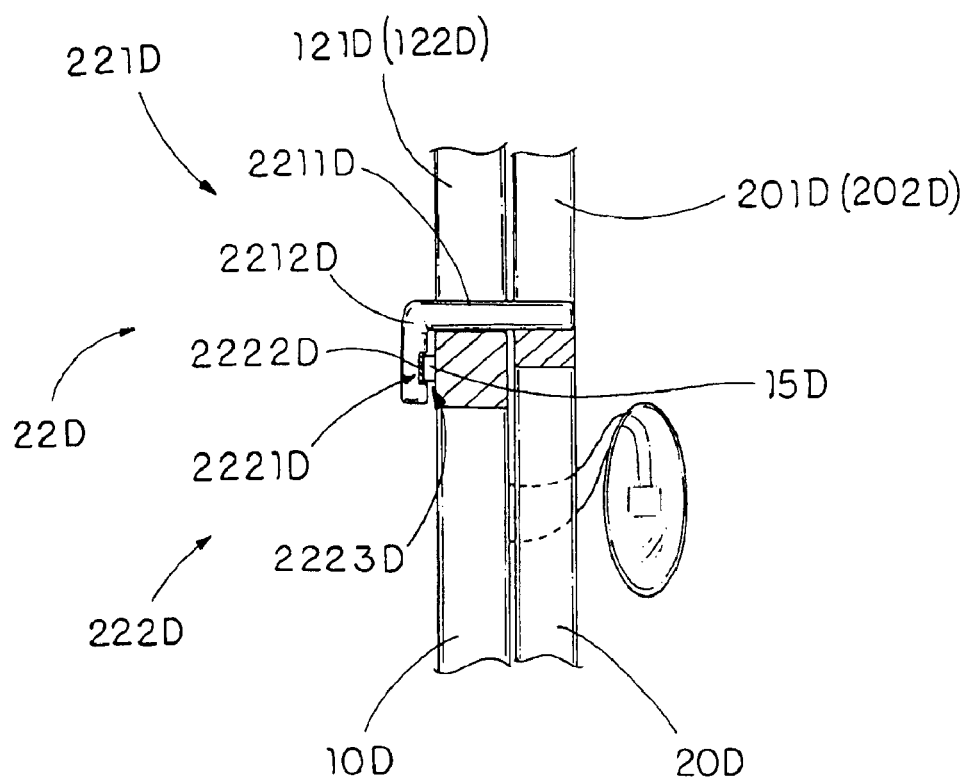
FIG. 8 is a side view of the spectacle set according to the above second preferred embodiment of the present invention, illustrating the detachable shelter frame mounted behind the primary spectacle frame.

As shown in FIG. 8, each of the supporting arms 221D, having a L-shaped, comprises a riding body 2211D, which is frontwardly extended from the outer side of the respective auxiliary lens 201D, 202D to ride on the outer side of the respective lens 121D, 122D of the frame body 11D, and a mounting body 2212D, which is downwardly and integrally extended from a rear end of the respective riding body 2211D towards the magnetic holder 15D of the primary spectacle frame 10D. In other words, when the shelter frame 21D is mounted behind the primary spectacle frame 10D, the riding bodies 2211D of the supporting arms 221D ride over the frame body 11D while the mounting bodies 2212D downwardly extend in front of the frame body 11D and toward the magnetic holders 15D respectively, so as to mount the detachable shelter frame 20D behind the primary spectacle frame 10D in position.

The magnetic seats 222D are connected to the mounting bodies 2212D of the supporting arms 221D respectively to magnetically attach to the magnetic holders 15D of the primary spectacle frame 10D. Accordingly, the two supporting arms 222D ride over and engage with the frame body 11D, so as to securely interlock the shelter frame 21D behind the primary spectacle frame 10D by preventing any upward, downward, and sideward movement of the shelter frame 21D.

Each of the magnetic seats 222D comprises a magnetic housing 2221D downwardly and suspendedly affixed to a distal end of the respective supporting arm 221D, wherein each magnetic seat 222D is made of non-magnetic material or soft-magnetic metal having magnetic attraction ability such as mild steel, low carbon steel and high grade steel, and a magnet 2222D mounted in the magnetic housing 2221D, which is arranged to face toward and align with the respective magnetic holder 15D of the frame body 11D when the shelter frame 21D of the detachable shelter frame 20D is mounted behind the primary spectacle frame 10D.

Furthermore, the magnetic holders 15D function as two engaging members frontwardly protruded from the outer sides of the lenses 121D, 122D of the frame body 11D respectively. Each of the magnets 2222D has a thickness smaller than a depth of the respective magnetic housing 2221D so as to define an engaging groove 2223D, so that the magnet 2222D is embedded in the magnetic housing 2221D for fittedly engaging with the respective engaging member of the magnetic holder 15D. In other words, the magnetic holders 15D are received in the two engaging grooves 2223D respectively to further guide the attaching arrangement 22D to magnetically attach to the magnetic holders 15D of the primary spectacle frame 10D.

As shown in FIG. 7, the detachable shelter frame 20D may comprises a clip bridge 23D extended between the two auxiliary lenses 201D, 202D for securely engaging with the primary bridge 11 ID of the primary spectacle frame 10D so as to further secure the attachment of the detachable shelter frame 20D behind the primary spectacle frame 10D.

Figure 9:
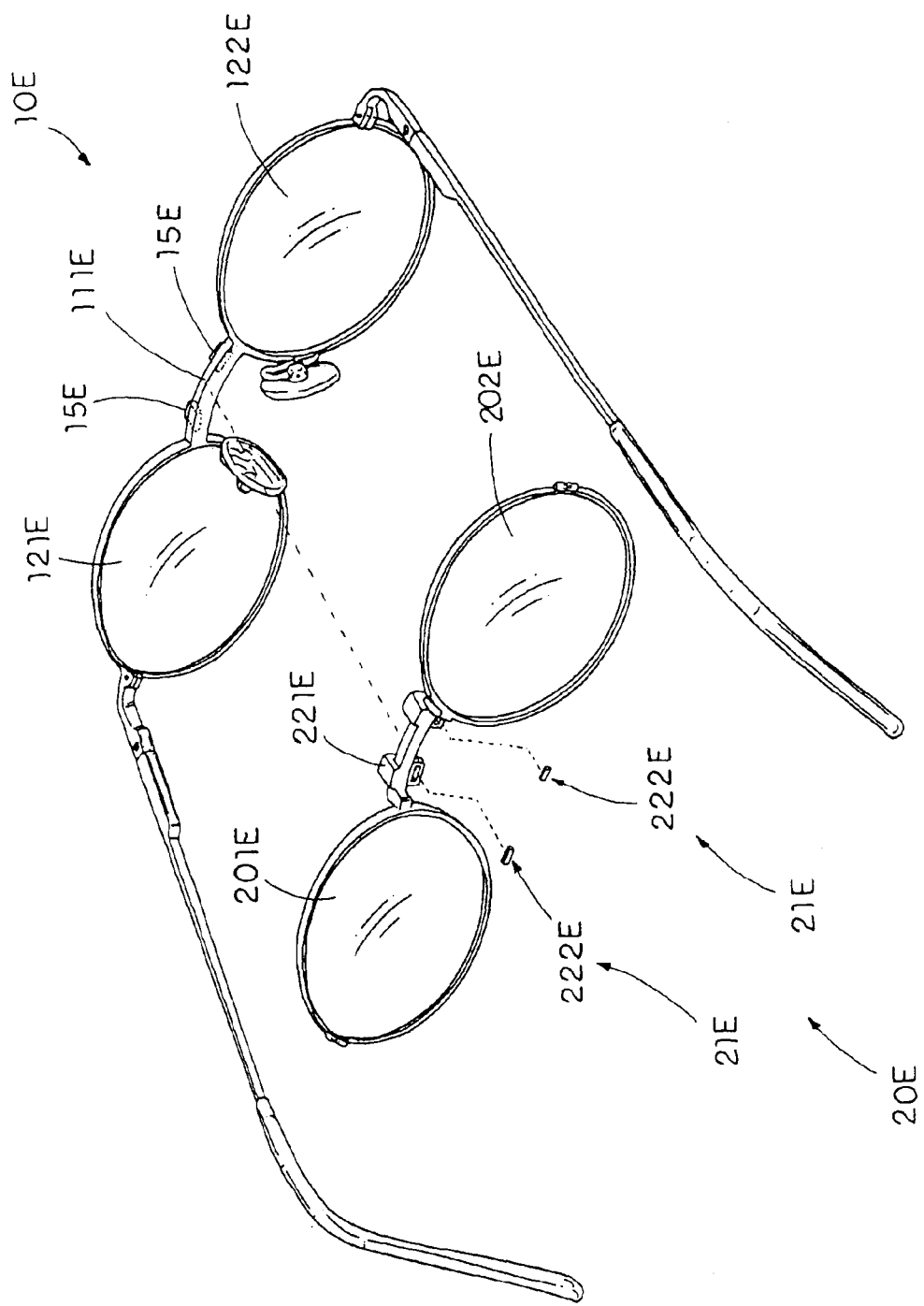
FIG. 9 illustrates an alternative mode of the spectacle set according to the above second preferred embodiment of the present invention.

FIG. 9 illustrates an alternative mode of the detachable shelter frame 20E according to the second embodiment of the present invention, wherein the primary spectacle frame 10E has the same structure except the two magnetic holders 15E are positioned at two inner sides of the lenses 121E, 122E of the frame body 11E.

The attaching arrangement 22E comprises two supporting arms 221E frontwardly extended from two inner sides of the auxiliary lenses 201E, 202E of the shelter frame 21E for riding on the primary bridge 111E of the frame body 11E so as to securely mount the shelter frame 21E behind the primary spectacle frame 10E and two magnetic seats 222E which are connected to the supporting arms 221E and arranged to magnetically attached to the magnetic holders 15E of the primary spectacle frame 10E respectively so as to hold the shelter frame 21E of the detachable shelter frame 20E behind the frame body 11E of the primary spectacle frame 10E in position.

It is worth to mention that the supporting arms 221E have the same structure of the supporting arms 221D of the third embodiment to interlock the shelter frame 21E with the frame body 11E. Accordingly, the supporting arms 221E also function as the bridge clip to ride on top of the primary bridge 111E of the frame body 11E for engaging with the primary bridge 11E so as to securely interlock the shelter frame 21E behind the primary spectacle frame 10E to prevent any upward, downward, and sideward movement of the shelter frame 21E with respect to the frame body 11E.

Figure 10:
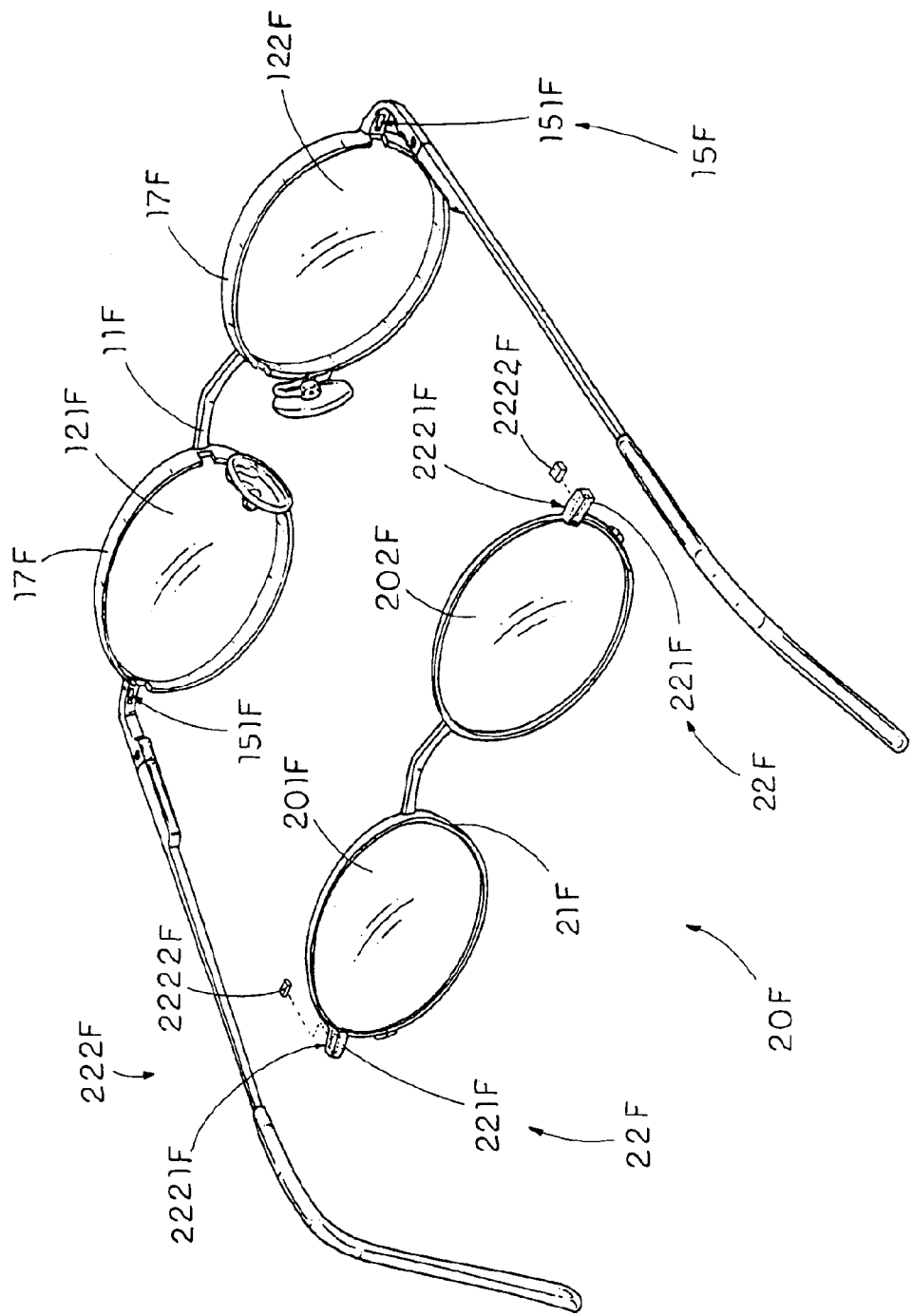
FIG. 10 is a perspective view of a spectacle set according to a third preferred embodiment of the present invention.

Referring to FIG. 10, a spectacle set according to a third embodiment illustrates an alternative mode of the first embodiment of the present invention, wherein the two magnetic holders 15F is provided at the outer sides of the lenses 121F, 122F of the frame body 11F respectively.

The primary spectacle frame 10F further comprises a pair of rim covers 17F rearwardly extended from the lenses 121F, 122F respectively for encircling the two auxiliary lenses 201F, 202F of the shelter frame 21F respectively when the detachable shelter frame 20F is mounted behind the primary spectacle frame 10F.

The two supporting arms 221F are outwardly extended from two outer sides of the auxiliary lenses 201F, 202F respectively towards magnetic holders 15F of the primary spectacle frame 10F wherein the two magnetic seats 222F which are connected to the supporting arms 221F respectively and arranged to magnetically attach to the magnetic holders 15F respectively so as to hold the shelter frame 21F of the detachable shelter frame 20F behind the frame body 21F of the primary spectacle frame 10F in position.

Each of the magnetic seats 222F comprises a magnetic housing 2221F provided on the respective supporting arm 221F wherein each magnetic seat 222F is made of non-magnetic material or soft-magnetic metal having magnetic attraction ability such as mild steel, low carbon steel and high grade steel, and a magnet 2222F mounted in the magnetic housing 2221F, which is arranged to face toward and align with the respective magnetic holder 15F of the frame body 11F when the shelter frame 21F of the detachable shelter frame 20F is mounted behind the primary spectacle frame 10F.

Figure 11:
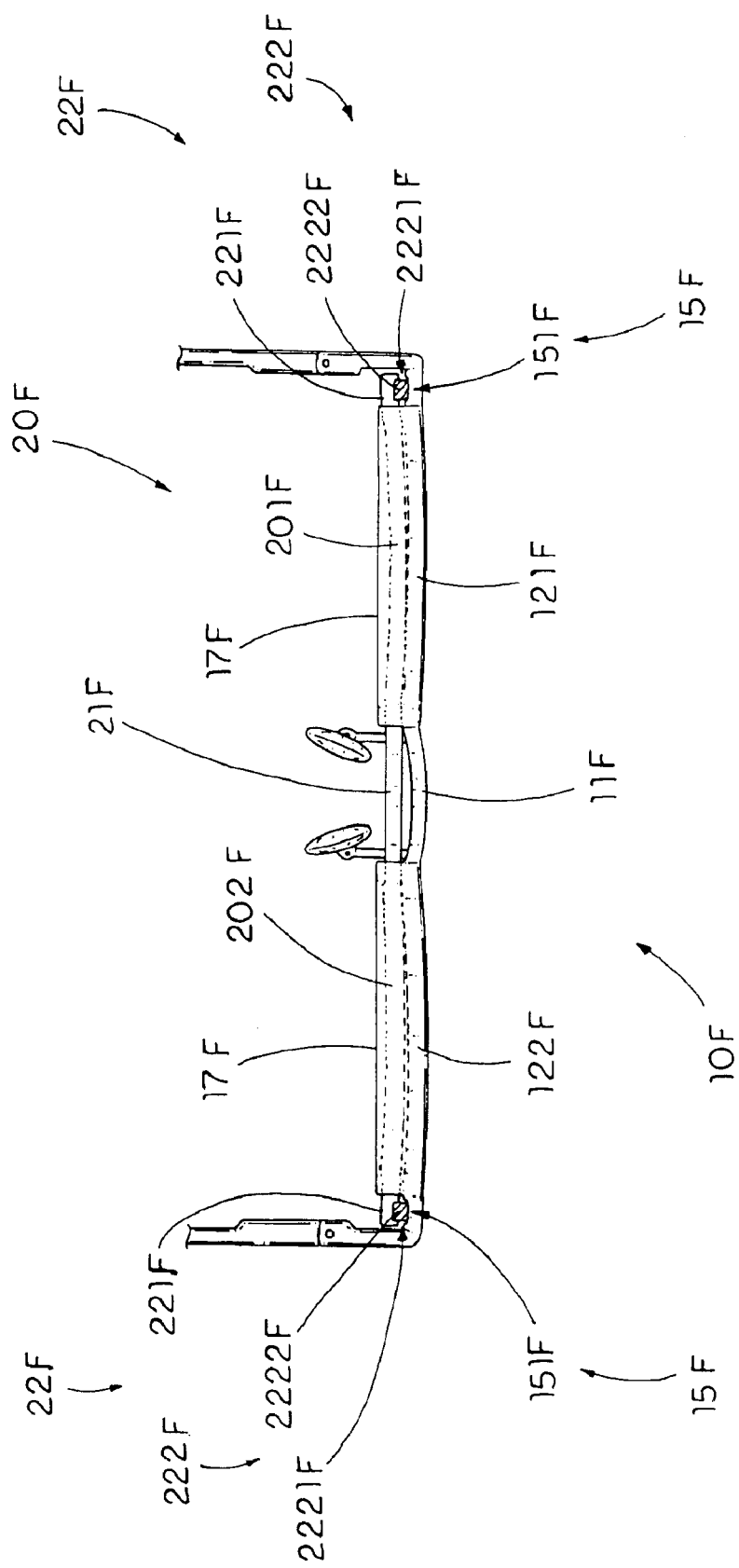
FIG. 11 is a top view of the spectacle set according to the above third preferred embodiment of the present invention, illustrating the detachable shelter frame mounted behind the primary spectacle frame.

As shown in FIG. 11, each of the magnetic holders 15F has an engaging slot 151F formed at the outer side of the respective lenses 121F, 122F to guide the two magnetic seats 222F to automatically align and attract with the two magnetic holders 15F respectively.

Accordingly, the rim covers 17F, each of which has a width at least wider than a gap formed between the lens 121F, 122F and the auxiliary lens 201F, 202F, encirclingly cover the gap between the auxiliary lenses 201F, 202F and the lenses 121F, 122F and periphery edges of the two auxiliary lenses 201F, 202F of the detachable shelter frame 20F respectively, so that the shelter frame 21F is hidden behind the frame body 11F to keep the ornamental appearance of the primary spectacle frame 10F, as shown in FIG. 11.

Figure 12:
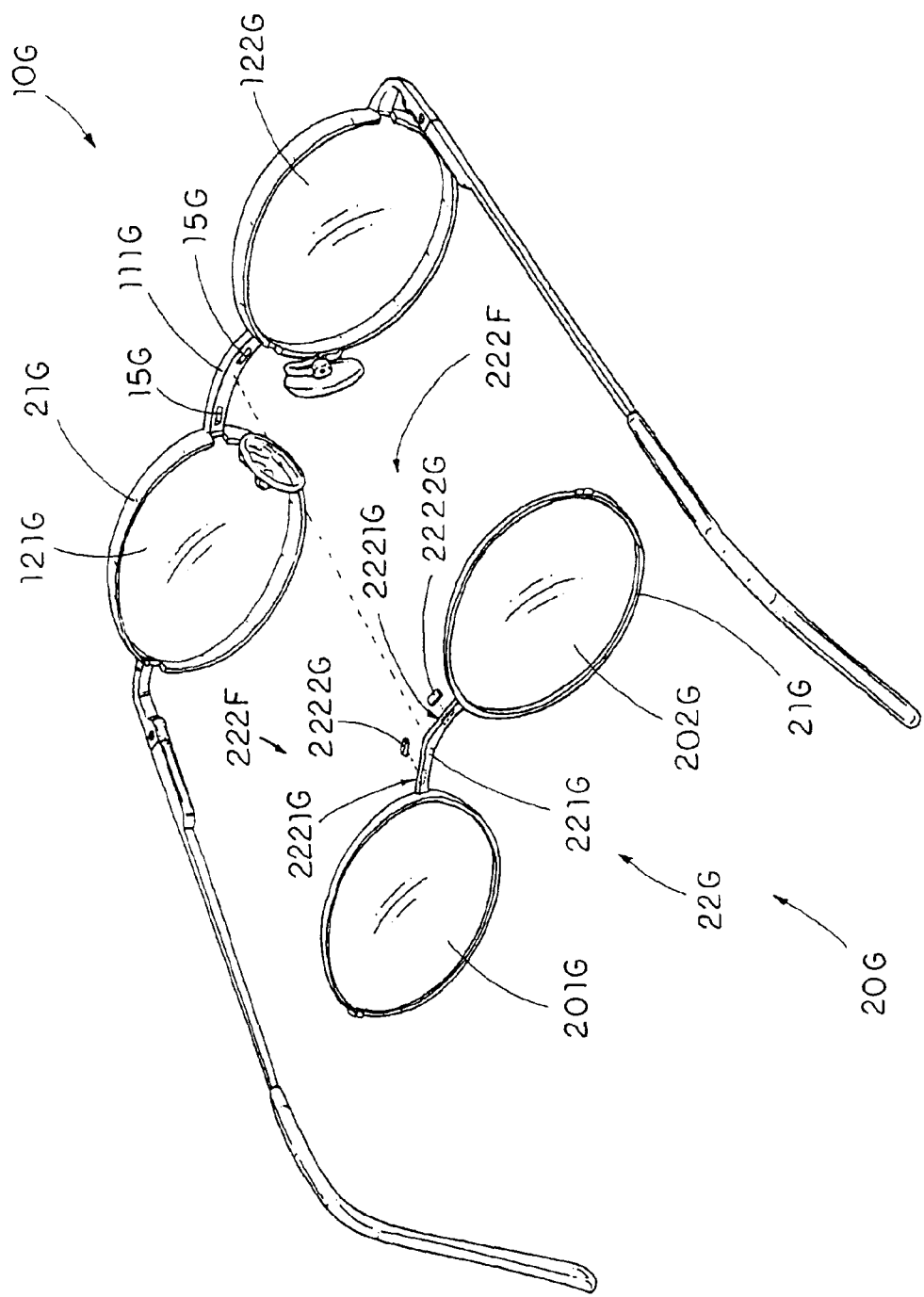
FIG. 12 illustrates an alternative mode of the spectacle set according to the above third preferred embodiment of the present invention.

FIG. 12 illustrates an alternative mode of the detachable shelter frame 20G according to the above third embodiment of the present invention, wherein the two magnetic holders 15G is provided at the inner sides of the lenses 121G, 122G of the frame body 11G respectively. Accordingly, the magnetic holders 15G are provided on the primary bridge 111G of the primary spectacle frame 10G, as shown in FIG. 12.

The two supporting arms are outwardly extended from two inner sides of the auxiliary lenses 201G, 202G respectively to form a bridge 221G between the auxiliary lenses 201G, 202G of the primary spectacle frame 10G wherein the two magnetic seats 222G which are provided on front surface of the bridge 221G and arranged to magnetically attach to the magnetic holders 15G respectively so as to hold the shelter frame 21G of the detachable shelter frame 20G behind the frame body 21G of the primary spectacle frame 10G in position.

Each of the magnetic seats 222G comprises a magnetic housing 2221G provided on the bridge 221G wherein each magnetic seat 222G is made of non-magnetic material or soft-magnetic metal having magnetic attraction ability such as mild steel, low carbon steel and high grade steel, and a magnet 2222G mounted in the magnetic housing 2221G, which is arranged to face toward and align with the respective magnetic holder 15G of the frame body 11G when the shelter frame 21G of the detachable shelter frame 20G is mounted behind the primary spectacle frame 10G.

Each of the magnetic holders 15G has an engaging groove 151G indented on a rear surface of the primary bridge 111G of the primary spectacle frame 10G, wherein each of the magnets 2222G has a thickness larger than a depth of the respective magnetic housing 2221G so as to form an engaging member for fittedly engaging with the respective engaging groove 151G of the magnetic holder 15G. Therefore, when the detachable shelter frame 20G is mounted behind the primary spectacle frame 10G, the shelter frame 21G is hidden behind the frame body 11G since the two auxiliary lenses 201G, 202G of the shelter frame 21G are encirclingly covered by the rim covers 17G of the primary spectacle frame 10G respectively.

Since the detachable shelter frame according to the above preferred embodiments and their alternatives is mounted behind the primary spectacle frame, the detachable shelter frame is held by the primary spectacle frame and supported by either the wearer's nose or the nose supports, so that the detachable shelter frame will never drop off from the primary spectacle frame accidentally. Thus, the ornamental appearance of the primary spectacle frame won't be blocked by the detachable shelter frame. Due to the rear-attaching configuration of the detachable shelter frame, the distance between the lenses of the primary spectacle frame and the auxiliary lenses of the detachable shelter frame can be minimized without altering the original structural design of the primary spectacle frame.

One skilled in the art will understand that the embodiment of the present invention as shown in the drawings and described above is exemplary only and not intended to be limiting.

While the foregoing description and diagram describe the preferred embodiments and their alternatives, it should be appreciated that certain obvious modifications, variations, and substitutions may be made without departing from the spirit and scope of the present invention by mounting the detachable shelter frame behind the primary spectacle frame with other attachment methods such as clipping. For example, the attachment between the primary spectacle frame and the detachable shelter frame can be any existing attaching device, such as magnetic engagement, clipping engagement, or resilient engagement.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A spectacle set, comprising:

a primary spectacle frame comprising a frame body for mounting a pair of lenses in position, wherein said frame body comprises a primary bridge connected between said two lenses, two side extensions provided at two outer sides of said lenses respectively for coupling with two temples respectively, and a pair of magnetic holders, each having a magnetic attraction ability, provided on a rear side of said frame body; and a detachable shelter frame comprising a shelter frame supporting two auxiliary lenses as two sunglasses lenses and an attaching arrangement provided on said shelter frame to detachably mount said shelter frame of said detachable shelter frame behind said frame body of said primary spectacle frame so as to align said two auxiliary lenses with said two lenses respectively, wherein said attaching arrangement comprises a pair of magnetic seats provided on a front side of said detachable shelter frame and arranged to magnetically attach to said magnetic holders respectively so as to mount said detachable shelter frame behind said primary spectacle frame, wherein said two magnetic holders are constructed as two rim lockers of said frame body of said primary spectacle frame and said two magnetic seats are provided around said two auxiliary lenses and facing frontwardly with respect to said two magnetic holders for magnetically attaching to said magnetic holders when said detachable shelter frame is positioned behind said primary spectacle frame.

2. The spectacle set, as recited in claim 1, wherein said attaching arrangement further comprises two supporting arms extending from said auxiliary lenses respectively and said two magnetic seats are connected to said supporting arms and positioned with respect to said magnetic holders of said primary spectacle frame.

3. A spectacle set, comprising:

a primary spectacle frame comprising a frame body for mounting a pair of lenses in position, wherein said frame body comprises a primary bridge connected between said two lenses, two side extensions provided at two outer sides of said lenses respectively for coupling with two temples respectively, and a pair of magnetic holders, each having a magnetic attraction ability, provided on a rear side of said frame body; and a detachable shelter frame comprising a shelter frame supporting two auxiliary lenses as two sunglasses lenses and an attaching arrangement provided on said shelter frame to detachably mount said shelter frame of said detachable shelter frame behind said frame body of said primary spectacle frame so as to align said two auxiliary lenses with said two lenses respectively, wherein said attaching arrangement comprises a pair of magnetic seats provided on a front side of said detachable shelter frame and arranged to magnetically attach to said magnetic holders respectively so as to mount said detachable shelter frame behind said primary spectacle frame, wherein said two magnetic seats are mounted on front surfaces of said two auxiliary lenses respectively are arranged to face toward and align with said magnetic holders of said frame body respectively when said detachable shelter frame is mounted behind said primary spectacle frame, wherein said two magnetic holders are provided at two lockers of said primary bridge between said two lenses of said primary spectacle frame and said two magnetic seats of said detachable shelter frame are provided at two inner side edges of said auxiliary lenses to magnetically attach to said magnetic holders respectively.

4. A spectacle set, comprising:

a primary spectacle frame comprising a frame body for mounting a pair of lenses in position, wherein said frame body comprises a primary bridge connected between said two lenses, two side extensions provided at two outer sides of said lenses respectively for coupling with two temples respectively, and a pair of magnetic holders, each having a magnetic attraction ability, provided on a rear side of said frame body; and a detachable shelter frame comprising a shelter frame supporting two auxiliary lenses as two sunglasses lenses and an attaching arrangement provided on said shelter frame to detachably mount said shelter frame of said detachable shelter frame behind said frame body of said primary spectacle frame so as to align said two auxiliary lenses with said two lenses respectively, wherein said attaching arrangement comprises a pair of magnetic seats provided on a front side of said detachable shelter frame and arranged to magnetically attach to said magnetic holders respectively so as to mount said detachable shelter frame behind said primary spectacle frame, wherein said two magnetic seats are mounted on front surfaces of said two auxiliary lenses respectively are arranged to face toward and align with said magnetic holders of said frame body respectively when said detachable shelter frame is mounted behind said primary spectacle frame, wherein each of said auxiliary lenses has a receiving cavity provided on said front surface thereof and said magnetic seats are mounted in said two receiving cavities respectively, wherein said two magnetic holders are provided at two lockers of said primary bridge between said two lenses of said primary spectacle frame and said two magnetic seats of said detachable shelter frame are provided at two inner side edges of said auxiliary lenses to magnetically attach to said magnetic holders respectively.

5. A spectacle set, comprising:

a primary spectacle frame comprising a frame body for mounting a pair of lenses in position, wherein said frame body comprises a primary bridge connected between said two lenses, two side extensions provided at two outer sides of said lenses respectively for coupling with two temples respectively, and a pair of magnetic holders, each having a magnetic attraction ability, provided on a rear side of said frame body; and a detachable shelter frame comprising a shelter frame supporting two auxiliary lenses as two sunglasses lenses and an attaching arrangement provided on said shelter frame to detachably mount said shelter frame of said detachable shelter frame behind said frame body of said primary spectacle frame so as to align said two auxiliary lenses with said two lenses respectively, wherein said attaching arrangement comprises a pair of magnetic seats provided on a front side of said detachable shelter frame and arranged to magnetically attach to said magnetic holders respectively so as to mount said detachable shelter frame behind said primary spectacle frame, wherein said two magnetic seats are mounted on front surfaces of said two auxiliary lenses respectively are arranged to face toward and align with said magnetic holders of said frame body respectively when said detachable shelter frame is mounted behind said primary spectacle frame, wherein each of said auxiliary lenses has a receiving cavity provided on said front surface thereof and said magnetic seats are mounted in said two receiving cavities respectively, wherein each of said magnetic seats comprises a tubular magnetic housing inserted in said receiving cavity of said respective auxiliary lens and a magnet mounted in said magnetic housing, wherein said magnets are arranged to face toward and align with said magnetic holders of said frame body when said detachable shelter frame is mounted behind said primary spectacle frame, wherein said two magnetic holders are provided at two lockers of said primary bridge between said two lenses of said primary spectacle frame and said two magnetic seats of said detachable shelter frame are provided at two inner side edges of said auxiliary lenses to magnetically attach to said magnetic holders respectively.

6. A spectacle set, comprising:

a primary spectacle frame comprising a frame body for mounting a pair of lenses in position, wherein said frame body comprises a primary bridge connected between said two lenses, two side extensions provided at two outer sides of said lenses respectively for coupling with two temples respectively, and a pair of magnetic holders, each having a magnetic attraction ability, provided on a rear side of said frame body; and a detachable shelter frame comprising a shelter frame supporting two auxiliary lenses as two sunglasses lenses and an attaching arrangement provided on said shelter frame to detachably mount said shelter frame of said detachable shelter frame behind said frame body of said primary spectacle frame so as to align said two auxiliary lenses with said two lenses respectively, wherein said attaching arrangement comprises a pair of magnetic seats provided on a front side of said detachable shelter frame and arranged to magnetically attach to said magnetic holders respectively so as to mount said detachable shelter frame behind said primary spectacle frame, wherein said two magnetic seats are mounted on front surfaces of said two auxiliary lenses respectively are arranged to face toward and align with said magnetic holders of said frame body respectively when said detachable shelter frame is mounted behind said primary spectacle frame, wherein each of said auxiliary lenses has a receiving cavity provided on said front surface thereof and said magnetic seats are mounted in said two receiving cavities respectively, wherein each of said magnetic seats comprises a tubular magnetic housing inserted in said receiving cavity of said respective auxiliary lens and a magnet mounted in said magnetic housing, wherein said magnets are arranged to face toward and align with said magnetic holders of said frame body when said detachable shelter frame is mounted behind said primary spectacle frame, wherein said two receiving cavities are two through holes formed in said two auxiliary lenses and each of said magnetic housing has a receiving groove coaxially formed around an outer circumferential surface wherein a width of said receiving groove should be at least equal to a width of said respective auxiliary lens in such a manner that when said magnetic housing is mounted in said receiving cavity of said respective auxiliary lens, an outer circumferential edge of said receiving cavity is substantially received in said receiving groove, wherein two outer portions of said magnetic housing are extended to said front surface and a rear surface of said auxiliary lens respectively so as to retain said magnet on said auxiliary lens in position, wherein said two magnetic holders are provided at two lockers of said primary bridge between said two lenses of said primary spectacle frame and said two magnetic seats of said detachable shelter frame are provided at two inner side edges of said auxiliary lenses to magnetically attach to said magnetic holders respectively.

7. A spectacle set, comprising:

a primary spectacle frame comprising a frame body for mounting a pair of lenses in position, wherein said frame body comprises a primary bridge connected between said two lenses, two side extensions provided at two outer sides of said lenses respectively for coupling with two temples respectively, and a pair of magnetic holders, each having a magnetic attraction ability, provided on at two inner sides of said two lenses of said primary spectacle frame respectively; and a detachable shelter frame comprising a shelter frame supporting two auxiliary lenses as two sunglasses lenses and an attaching arrangement provided on said shelter frame to detachably mount said shelter frame of said detachable shelter frame behind said frame body of said primary spectacle frame so as to align said two auxiliary lenses with said two lenses respectively, wherein said attaching arrangement comprises a pair of magnetic seats provided at two inner side edges of said two auxiliary lenses respectively and arranged to magnetically attach to said magnetic holders respectively so as to mount said detachable shelter frame behind said primary spectacle frame, wherein said two magnetic seats are mounted on front surfaces of said two auxiliary lenses respectively are arranged to face toward and align with said magnetic holders of said frame body respectively when said detachable shelter frame is mounted behind said primary spectacle frame.

8. The spectacle set, as recited in claim 7, wherein said attaching arrangement further comprises two supporting arms extending from said two inner side edges of said auxiliary lenses respectively and said two magnetic seats are connected to said supporting arms with respect to said magnetic holders of said primary spectacle frame.

9. The spectacle set, as recited in claim 7, wherein said two magnetic holders are provided at two end portions of a rear surface of said primary bridge of said primary spectacle frame and said two magnetic seats are provided at two end portions of a front surface of a bridge connected between said two auxiliary lenses with respect to said magnetic holders.

10. The spectacle set, as recited in claim 9, wherein said primary spectacle frame further comprises a pair of rim covers rearwardly extended from said lenses respectively for encircling said two auxiliary lenses of said shelter frame respectively when said detachable shelter frame is mounted behind said primary spectacle frame, wherein said rim covers, each of which has a width at least wider than a gap formed between said lens and said auxiliary lens, encirclingly cover said gap between said auxiliary lenses and said lenses and periphery edges of said two auxiliary lenses of said detachable shelter frame respectively.

11. The spectacle set, as recited in claim 7, wherein said primary spectacle frame further comprises a pair of rim covers rearwardly extended from said lenses respectively for encircling said two auxiliary lenses of said shelter frame respectively when said detachable shelter frame is mounted behind said primary spectacle frame, wherein said rim covers, each of which has a width at least wider than a gap formed between said lens and said auxiliary lens, encirclingly cover said gap between said auxiliary lenses and said lenses and periphery edges of said two auxiliary lenses of said detachable shelter frame respectively.

12. A spectacle set, comprising:
  a primary spectacle frame comprising a frame body for mounting a pair of lenses in position, wherein said frame body comprises a primary bridge connected between said two lenses, and two side extensions provided at two outer sides of said lenses respectively for coupling with two temples respectively;
  a detachable shelter frame comprising a shelter frame supporting two auxiliary lenses as two sunglasses lenses and an attaching arrangement provided on said shelter frame to detachably mount said shelter frame of said detachable shelter frame behind said frame body of said primary spectacle frame so as to align said two auxiliary lenses with said two lenses respectively, wherein said attaching arrangement comprises a clip bridge extended between said two auxiliary lenses to securely engage with said primary bridge of said primary spectacle frame from behind of said primary spectacle frame so as to mount said detachable shelter frame behind said primary spectacle frame, wherein said clip bridge is in U-shaped and comprises two frontwardly extending side wires adapted for supporting on two ends of said primary bridge of said frame body and a downwardly curved clipping wire extending in front of said primary bridge, so as to securely clip said clip bridge on said primary bridge when said detachable shelter frame is mounted behind said primary spectacle frame.

13. The spectacle set, as recited in claim 12, wherein said primary spectacle frame further comprises a pair of magnetic holders, each having a magnetic attraction ability, provided on two inner sides of said lenses of said frame body at a rear side thereof, wherein said attaching arrangement comprises a pair of magnetic seats provided on two inner sides of said two auxiliary lenses of said detachable shelter frame at a front side thereof and arranged to magnetically attach to said magnetic holders respectively so as to mount said detachable shelter frame behind said primary spectacle frame.

14. The spectacle set, as recited in claim 13, wherein said two magnetic holders are provided at two end portions of a rear surface of said primary bridge of said primar spectacle frame and said two magnetic seats are provided at two end portions of a front surface of a bridge connected between said two auxiliary lenses with respect to said magnetic holders.

15. The spectacle set, as recited in claim 14, wherein each of said magnetic seats comprises a magnetic housing and a magnet mounted in said magnetic housing, wherein said magnetic seats are arranged to face toward and align with said magnetic holders of said frame body respectively when said detachable shelter frame is mounted behind said primary spectacle frame.

16. The spectacle set, as recited in claim 13, wherein each of said magnetic seats comprises a magnetic housing and a magnet mounted in said magnetic housing, wherein said magnetic seats are arranged to face toward and align with said magnetic holders of said frame body respectively when said detachable shelter frame is mounted behind said primary spectacle frame.

17. The spectacle set, as recited in claim 12, wherein said primary spectacle frame further comprises a pair of magnetic holders, each having a magnetic attraction ability, provided on two outer sides of said lenses of said frame body at a rear side thereof, wherein said attaching arrangement comprises a pair of magnetic seats provided on two outer sides of said two auxiliary lenses of said detachable shelter frame at a front side thereof and arranged to magnetically attach to said magnetic holders respectively so as to mount said detachable shelter frame behind said primary spectacle frame.

18. The spectacle set, as recited in claim 17, wherein said two magnetic holders are provided at rear surfaces of said two side extensions and said two magnetic seats are facing frontwardly for magnetically attaching to said magnetic holders.

19. The spectacle set, as recited in claim 18, wherein each of said magnetic seats comprises a magnetic housing and a magnet mounted in said magnetic housing, wherein said magnetic seats are arranged to face toward and align with said magnetic holders of said frame body respectively when said detachable shelter frame is mounted behind said primary spectacle frame.

20. The spectacle set, as recited in claim 17, wherein each of said magnetic seats comprises a magnetic housing and a magnet mounted in said magnetic housing, wherein said magnetic seats are arranged to face toward and align with said magnetic holders of said frame body respectively when said detachable shelter frame is mounted behind said primary spectacle frame.

21. A spectacle set, comprising:
  a primary spectacle frame comprising a frame body for mounting a pair of lenses in position, wherein said frame body comprises a primary bridge connected between said two lenses, two side extensions provided at two outer sides of said lenses respectively for coupling with two temples respectively, and a pair of magnetic holders, each having a magnetic attraction ability, provided on a rear side of said frame body; and
  a detachable shelter frame comprising a shelter frame supporting two auxiliary lenses as two sunglasses lenses and an attaching arrangement provided on said shelter frame to detachably mount said shelter frame of said detachable shelter frame behind said frame body of said primary spectacle frame so as to align said two auxiliary lenses with said two lenses respectively, wherein said attaching arrangement comprises a pair of magnetic seats provided on a front side of said detachable shelter frame and arranged to magnetically attach to said magnetic holders respectively so as to mount said detachable shelter frame behind said primary spectacle frame, wherein said two magnetic holders are integrally provided at said two side extensions of said primary spectacle frame and said two magnetic seats are provided at outer sides of said two auxiliary lenses respectively and arranged to magnetically attach to said magnetic holders when said detachable shelter frame is positioned behind said primary spectacle frame, wherein each of said magnetic seats comprises a magnetic housing and a magnet mounted in said magnetic housing, wherein said magnetic seats are arranged to face toward and align with said magnetic holders of said frame body respectively when said detachable shelter frame is mounted behind said primary spectacle frame, wherein each of said magnetic seats comprises a magnetic housing and a magnet mounted in said magnetic housing, wherein said magnetic seats are arranged to face toward and align with said magnetic holders of said frame body respectively when said detachable shelter frame is mounted behind said primary spectacle frame.

22. The spectacle set, as recited in claim 21, wherein said two magnetic holders form as two engaging members protruded from said frame body, wherein each of said magnets having a thickness is smaller than a depth of said respective magnetic housing so as to define an engaging groove when said magnet is embedded in said magnetic housing for fittedly engaging with said respective engaging member of said magnetic holder.

23. The spectacle set, as recited in claim 21, wherein said attaching arrangement comprises a clip bridge extended between said two auxiliary lenses to securely engage with said primary bridge of said primary spectacle frame from behind of said primary spectacle frame so as to mount said detachable shelter frame behind said primary spectacle frame, wherein said clip bridge is in U-shaped and comprises two frontwardly extending side wires adapted for supporting on two ends of said primary bridge of said frame body and a downwardly curved clipping wire extending in front of said primary bridge, so as to securely clip said clip bridge on said primary bridge when said detachable shelter frame is mounted behind said primary spectacle frame.

24. The spectacle set, as recited in claim 21, wherein said attaching arrangement comprises a clip bridge extended between said two auxiliary lenses to securely engage with said primary bridge of said primary spectacle frame from behind of said primary spectacle frame so as to mount said detachable shelter frame behind said primary spectacle frame, wherein said clip bridge is in U-shaped and comprises two frontwardly extending side wires adapted for supporting on two ends of said primary bridge of said frame body and a downwardly curved clipping wire extending in front of said primary bridge, so as to securely clip said clip bridge on said primary bridge when said detachable shelter frame is mounted behind said primary spectacle frame.

* * * * *